(12) United States Patent
Lee et al.

(10) Patent No.: US 11,465,139 B2
(45) Date of Patent: Oct. 11, 2022

(54) THERMALLY STABLE HYDROCARBON-BASED ANION EXCHANGE MEMBRANE AND IONOMERS

(71) Applicants: Sangwoo Lee, Cohoes, NY (US); Chulsung Bae, Cohoes, NY (US); Carrie Lynn Trant, Troy, NY (US)

(72) Inventors: Sangwoo Lee, Cohoes, NY (US); Chulsung Bae, Cohoes, NY (US); Carrie Lynn Trant, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/208,364

(22) Filed: Mar. 22, 2021

(65) Prior Publication Data

US 2021/0299649 A1   Sep. 30, 2021

Related U.S. Application Data

(60) Provisional application No. 62/992,230, filed on Mar. 20, 2020.

(51) Int. Cl.
*B01J 41/14* (2006.01)
*C08J 5/22* (2006.01)
(Continued)

(52) U.S. Cl.
CPC ............ *B01J 41/14* (2013.01); *C08F 212/08* (2013.01); *C08F 212/32* (2013.01); *C08J 5/2231* (2013.01); *C08J 2325/08* (2013.01)

(58) Field of Classification Search
CPC .... C08J 5/2231; C08J 2325/08; C08F 212/32; C08F 212/08
(Continued)

(56) References Cited

U.S. PATENT DOCUMENTS

| | | | |
|---|---|---|---|
| 4,126,589 A | * | 11/1978 | Hamada ................... C08J 5/225 521/31 |
| 6,590,067 B2 | | 7/2003 | Kerres et al. |

(Continued)

FOREIGN PATENT DOCUMENTS

| CN | 102869448 A | 1/2013 |
|---|---|---|
| CN | 103694490 A | 4/2014 |

(Continued)

OTHER PUBLICATIONS

Fan et al. "Living Anionic Surface-Initiated Polymerization (LASIP) of Styrene from Clay Nanoparticles Using Surface Bound 1,1-Diphenylethylene (DPE) Initiators", Langmuir 2002, 18, 4511-4518 (Year: 2002).*

(Continued)

*Primary Examiner* — Michael M. Bernshteyn
(74) *Attorney, Agent, or Firm* — Murtha Cullina LLP; Anthony P. Gangemi

(57) ABSTRACT

An anion exchange membrane is composed of a copolymer of 1,1-diphenylethylene and one or more styrene monomers, such as 4-tert-butylstyrene. The copolymer includes a backbone substituted with a plurality of ionic groups coupled to phenyl groups on the backbone via hydrocarbyl tethers between about 1 and about 7 carbons in length. High-temperature conditions enabled by these copolymers enhance conductivity performance, making them particularly suitable for use in anion exchange membranes in fuel cells, electrolyzers employing hydrogen, ion separations, etc. The properties of the membranes can be tuned via the degree of functionalization of the phenyl groups and selection of the functional groups, such as quaternary ammonium groups. Several processes can be used to incorporate the desired ionic functional groups into the polymers, such as chloromethylation, radical bromination, Friedel-Crafts acy- (Continued)

lation and alkylation, sulfonation followed by amination, or combinations thereof.

5 Claims, 10 Drawing Sheets

(51) Int. Cl.
    *C08F 212/32* (2006.01)
    *C08F 212/08* (2006.01)
(58) Field of Classification Search
    USPC .......................................................... 521/27
    See application file for complete search history.

(56) References Cited

U.S. PATENT DOCUMENTS

| | | | |
|---|---|---|---|
| 7,078,121 | B2 | 7/2006 | Kanaoka et al. |
| 7,615,300 | B2 | 11/2009 | Bae |
| 7,671,157 | B2 | 3/2010 | Bae |
| 7,888,397 | B1 | 2/2011 | Hibbs et al. |
| 8,445,141 | B2 | 5/2013 | Kitamura et al. |
| 8,697,203 | B2 | 4/2014 | Koenig |
| 8,809,483 | B1 | 8/2014 | Hibbs |
| 9,051,431 | B2 | 6/2015 | Kim et al. |
| 9,276,282 | B2 | 3/2016 | Zhang et al. |
| 9,534,097 | B2 | 1/2017 | Hibbs |
| 9,580,541 | B1 | 2/2017 | Fujimoto et al. |
| 9,580,824 | B2* | 2/2017 | Masel ................. C25B 9/23 |
| 9,988,526 | B2 | 6/2018 | Rodrigues et al. |
| 10,053,534 | B2 | 8/2018 | Fujimoto |
| 10,053,535 | B2 | 8/2018 | Kim et al. |
| 10,170,799 | B2 | 1/2019 | Ouchi et al. |
| 10,272,424 | B2* | 4/2019 | Bae ......................... C08F 8/04 |
| 10,290,890 | B2 | 5/2019 | Yan et al. |
| 10,294,325 | B2 | 5/2019 | Fujimoto |
| 10,370,483 | B2 | 8/2019 | Kim et al. |
| 10,435,504 | B2 | 10/2019 | Bae et al. |
| 11,236,196 | B2 | 2/2022 | Bae et al. |
| 2002/0010261 | A1* | 1/2002 | Callahan ............... H01B 1/122 524/832 |
| 2002/0061431 | A1 | 5/2002 | Koyama et al. |
| 2002/0062046 | A1 | 5/2002 | Swan et al. |
| 2003/0056669 | A1 | 3/2003 | Miller et al. |
| 2003/0114598 | A1 | 6/2003 | Li et al. |
| 2003/0134936 | A1 | 7/2003 | West et al. |
| 2003/0173547 | A1 | 9/2003 | Yamakawa et al. |
| 2006/0004177 | A1 | 1/2006 | Gao et al. |
| 2006/0135702 | A1* | 6/2006 | Wang ................... H01M 8/1081 525/344 |
| 2007/0048579 | A1 | 3/2007 | Bae |
| 2008/0262163 | A1 | 10/2008 | Bae |
| 2009/0004528 | A1 | 1/2009 | Fritsch et al. |
| 2009/0280383 | A1 | 11/2009 | MacKinnon et al. |
| 2010/0041834 | A1 | 2/2010 | Bae |
| 2010/0047657 | A1 | 2/2010 | MacKinnon et al. |
| 2010/0279204 | A1 | 11/2010 | Isomura et al. |
| 2011/0207028 | A1 | 8/2011 | Fukuta et al. |
| 2014/0024728 | A1* | 1/2014 | Kim .................... C08G 65/4006 521/30 |
| 2014/0227627 | A1 | 8/2014 | He et al. |
| 2014/0275300 | A1 | 9/2014 | Kim et al. |
| 2014/0353241 | A1 | 12/2014 | Yin et al. |
| 2015/0111128 | A1 | 4/2015 | Matsuda et al. |
| 2015/0307659 | A1* | 10/2015 | Hong ..................... H01M 8/20 429/492 |
| 2017/0203289 | A1 | 7/2017 | Bae et al. |
| 2017/0252707 | A1 | 9/2017 | Bahar et al. |
| 2017/0355811 | A1 | 12/2017 | Bae et al. |
| 2019/0308185 | A1 | 10/2019 | Bae et al. |
| 2020/0055980 | A1 | 2/2020 | Bae et al. |
| 2020/0091535 | A1 | 3/2020 | Bae et al. |
| 2020/0094241 | A1 | 3/2020 | Bae et al. |
| 2020/0172659 | A1 | 6/2020 | Bae et al. |
| 2020/0223997 | A1 | 7/2020 | Bae et al. |
| 2020/0238272 | A1 | 7/2020 | Bae et al. |
| 2021/0108067 | A1 | 4/2021 | Bae et al. |
| 2022/0052357 | A1 | 2/2022 | Bae et al. |

FOREIGN PATENT DOCUMENTS

| | | | |
|---|---|---|---|
| CN | 106040318 | A | 10/2016 |
| EP | 2324529 | B1 | 1/2016 |
| JP | H06188005 | A | 7/1994 |
| JP | 2001002738 | A | 1/2001 |
| JP | 2003203648 | A | 7/2003 |
| JP | 2004131662 | A | 4/2004 |
| JP | 2012049111 | A | 3/2012 |
| JP | 2013505825 | A | 2/2013 |
| JP | 2016032098 | A | 3/2016 |
| JP | 2018502180 | A | 1/2018 |
| KR | 20140064308 | A | 5/2014 |
| KR | 20150060159 | A | 6/2015 |
| WO | WO-2006066505 | A1 | 6/2006 |
| WO | WO-2007079004 | A2 | 7/2007 |
| WO | WO-2012081026 | A2 | 6/2012 |
| WO | WO-2016014636 | A1 | 1/2016 |
| WO | WO-2016081432 | A1 | 5/2016 |
| WO | WO-2017172824 | A1 | 10/2017 |
| WO | WO-2018119020 | A1 | 6/2018 |
| WO | WO-2019010290 | A1 | 1/2019 |
| WO | WO-2019068051 | A2 | 4/2019 |

OTHER PUBLICATIONS

Adhikari S et al., "Ionomers for Electrochemical Energy Conversion & Storage Technologies," Polymer, 2020, 123080.
Ayers K, "Benchmarking Advanced Water Splitting Technologies: Best Practices in Materials Characterization," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p170_ayers_2020_o.pdf (last accessed Dec. 15, 2020), 21 pp.
Ayers K, "Economic Production of Hydrogen through the Development of Novel, High Efficiency Electrocatalysts for Alkaline Membrane Electrolysis," presented at the 2017 U.S. Department of Energy (DOE) Hydrogen and Fuel Cells Program and Vehicle Technologies Office Annual Merit Review and Peer Evaluation Meeting on Jun. 5-9, 2017 in Washington, D.C., accessible at https://www.hydrogen.energy.gov/pdfs/review17/pd147_ayers_2017_o.pdf (last accessed Dec. 15, 2020), 29 pp.
Bae C, "Channeling Engineering of Hydroxide Ion Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Bae C, "Cyclic Olefin Copolymer based Alkaline Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/fc307_bae_2019_p.pdf (last accessed Dec. 15, 2020), 13 pp.
Bae C, "Cyclic Olefin Copolymer based Alkaline Exchange Polymers and Reinforced Membranes," presented at the 2020 U.S. Department of Energy Hydrogen and Fuel Cells Program Annual Merit Review and Peer Evaluation Meeting on May 19, 2020, accessible at https://www.hydrogen.energy.gov/pdfs/review20/fc307_bae_2020_o.pdf (last accessed Dec. 15, 2020), 21 pp.
Bae C, "Development of Versatile Polymer Materials for Anion Exchange Membranes in Electrochemical Energy Conversion Technology," ECS Meeting Abstracts, 2020, MA2020-02, 2363 (1 p.).
Bae C et al., "Cyclic Olefin Copolymer-Based Alkaline Exchange Polymers and Reinforced Membranes" in 2019 Annual Progress Report: DOE Hydrogen and Fuel Cells Program, U.S. Department of Energy, Document No. DOE/GO-102020-5257, Apr. 2020, acces-

(56) References Cited

OTHER PUBLICATIONS sible at https://www.hydrogen.energy.gov/pdfs/progress19/fc_fc307_bae_2019.pdf (last accessed Dec. 15, 2020), 5 pp.
Bae C, "Ion Conducting Polymer Electrolyte Membranes for Energy Conversion Technology," presented at the Rensselaer Polytechnic Institute Center for Future Energy Systems (RPI CFES) Symposium on Apr. 10, 2019 in Troy, New York, accessible at https://cfes.rpi.edu/sites/default/files/A7%20Bae.pdf (last accessed Dec. 15, 2020), 19 pp.
Bae C, "New functional polymers for alternative energy applications," presented at University of Nevada, Las Vegas (UNLV) Renewable Energy Symposium on Aug. 20, 2008 in Las Vegas, Nevada, accessible at https://digitalscholarship.unlv.edu/cgi/viewcontent.cgi?article=1023&context=res (last accessed Jan. 16, 2021), 21 pp.
Black SB et al., "FTIR characterization of water-polymer interactions in superacid polymers," The Journal of Physical Chemistry B, 2013, 117 (50), 16266-16274.
Briem M et al., "Comparison of Novel 1,1-Diphenylethylene Alternating Copolymer and Polystyrene Based Anion Exchange Membranes," ECS Meeting Abstracts, 2020, MA2020-2, 2242 with Presentation (31 pp.).
Brownell LV et al., "Synthesis of polar block grafted syndiotactic polystyrenes via a combination of iridium-catalyzed activation of aromatic C-H bonds and atom transfer radical polymerization," Journal of Polymer Science Part A: Polymer Chemistry, 2009, 47(23), 6655-6667.
Chang Y et al., "Acidity Effect on Proton Conductivity of Hydrocarbon-Based Ionomers," ECS Transactions, 2010, 33 (1), 735.
Chang Y et al., "Aromatic ionomers with highly acidic sulfonate groups: acidity, hydration, and proton conductivity," Macromolecules, 2011, 44 (21), 8458-8469.
Chang Y et al., "Scope and regioselectivity of iridium-catalyzed C-H borylation of aromatic main-chain polymers," Macromolecules, 2013, 46 (5), 1754-1764.
Chang Y et al., "Direct Fluorination of the Carbonyl Group of Benzophenones Using DeoxoFluor®: Preparation of Bis (4-Fluorophenyl) Difluoromethane," Organic Syntheses, 2010, 87, 245-252.
Chang Y et al., "Direct nucleophilic fluorination of carbonyl groups of benzophenones and benzils with Deoxofluor," Tetrahedron, 2008, 64 (42), 9837-9842.
Chang Y et al., "Effect of superacidic side chain structures on high conductivity aromatic polymer fuel cell membranes," Macromolecules, 2015, 48(19), 7117-7126.
Chang Y et al., "Partially fluorinated sulfonated poly (ether amide) fuel cell membranes: influence of chemical structure on membrane properties," Polymers 3(1), 222-235.
Chang Y et al., "Poly (Arylene Ether Sulfone) Ionomers with Different Acidity Strengths and Fuel Cell Membrane Properties," ECS Transactions, 2013, 50(2), 1031.
Chang Y et al., "Polymer electrolyte membranes based on poly (arylene ether sulfone) with pendant perfluorosulfonic acid," Polymer Chemistry, 2013, 4(2), 272-281.
Chang Y et al., "Polymer-supported acid catalysis in organic synthesis," Current Organic Synthesis, 2011,8 (2), 208-236.
Chang Y et al., "Polystyrene Ionomers Functionalized with Partially Fluorinated Short Side-Chain Sulfonic Acid for Fuel Cell Membrane Applications," in Sustainable Membrane Technology for Energy, Water, and Environment, Ismail AF & Matsuura T (eds.), John Wiley & Sons, 2012, pp. 243-249.
Chang Y et al., "Polystyrene-Based Superacidic Ionomers: Synthesis and Proton Exchange Membrane Applications," ECS Transactions, 2011, 41 (1), 1615.
Chang Y et al., "Polystyrene-based superacidic solid acid catalyst: synthesis and its application in biodiesel production," RSC advances, 2014, 4 (88), 47448-47454.
Chung HT et al., "Effect of organic cations on hydrogen oxidation reaction of carbon supported platinum," Journal of The Electrochemical Society, 2016, 163(14), F1503-F1509.

CN Search Report dated Oct. 29, 2019 in Application No. 201580062578.2.
CN Supplemental Search Report dated Mar. 25, 2020 in Application No. 201580062578.2.
Dang, H-S., et al., "Poly(Phenylene Oxide) Functionalized With Quaternary Ammonium Groups via Flexible Alkyl Spacers for High-performance Anion Exchange Membranes," Journal of Materials Chemistry A, Jan. 1, 2015, vol. 3, No. 10, pp. 5280-5284, XP055564621.
Date B et al., "Synthesis and morphology study of SEBS triblock copolymers functionalized with sulfonate and phosphonate groups for proton exchange membrane fuel cells," Macromolecules, 2018, 51(3), 1020-1030.
Einsla ML et al., "Toward improved conductivity of sulfonated aromatic proton exchange membranes at low relative humidity," Chemistry of Materials, 2008, 20, 5636-5642.
EP Partial Supplementary European Search Report dated Dec. 20, 2021, in application No. EP19791619.0.
EP Office Action dated Mar. 12, 2020, in Application No. 15860054.4.
EP Supplemental Search Report and Written Opinion dated Jun. 15, 2018, in Application No. 15860054.4.
Ex Parte Quayle Action dated Mar. 5, 2019, in U.S. Appl. No. 15/527,967.
Final Office Action dated Jun. 3, 2021, in U.S. Appl. No. 16/471,358.
Gottesfeld S et al., "Anion exchange membrane fuel cells: Current status and remaining challenges," Journal of Power Sources, 2018, 375, 170-184.
Gottesfeld S et al., "Direct ammonia fuel cells (DAFCs) for transport application," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Guzman-Guiterrez, et al., "Dramatic Enhancement of Superacid-Catalyzed Polyhydroxyalkylation Reactions," Macromolecules, 2011,44, pp. 194-202.
Han KW et al., "Molecular dynamics simulation study of a polysulfone-based anion exchange membrane in comparison with the proton exchange membrane," The Journal of Physical Chemistry C, 2014, 118(24), 12577-12587.
Hao, J., et al., "Crosslinked High-performance Anion Exchange Membranes Based on Poly(Styrene-b-(Ethylene-co-butylene)-b-styrene)," Journal of Membrane Science, Jan. 24, 2018, vol. 551, pp. 66-75, XP055647135.
Henkensmeier D et al., "Overview: State-of-the Art Commercial Membranes for Anion Exchange Membrane Water Electrolysis," Journal of Electrochemical Energy Conversion and Storage, 2021,18,024001 (18 pp.).
Hickner M et al., "Membrane Databases—New Schema and Dissemination (Supplement to: Development of Design Rules for High Hydroxide Transport in Polymer Architectures)," at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/ia022_hickner_2019_p.pdf (last accessed Dec. 15, 2020), 14 pp.
Hwang T et al., "Ultrafiltration using graphene oxide surface-embedded polysulfone membranes," Separation and Purification Technology, 2016, 166, 41-47.
International Preliminary Report on Patentability dated Jan. 7, 2020 in Application No. PCT/US2018/040898.
International Preliminary Report on Patentability dated Jun. 25, 2019 in Application No. PCT/US2017/067482.
International Preliminary Report on Patentability dated May 23, 2017, in Application No. PCT/US2015/061036.
International Preliminary Report on Patentability dated Oct. 27, 2020, in Application No. PCT/US2019/028925.
International Search Report and Written Opinion dated Nov. 30, 2018 in Application No. PCT/US2018/040898.
International Search Report and Written Opinion dated Feb. 4, 2016, in Application No. PCT/US2015/061036.

(56) References Cited

OTHER PUBLICATIONS

International Search Report and Written Opinion dated Mar. 25, 2020, in Application No. PCT/US2019/063173.
International Search Report and Written Opinion dated Mar. 6, 2018, in Application No. PCT/US2017/067482.
International Search Report and Written Opinion dated May 27, 2021, in Application No. PCT/US2021/014759.
International Search Report and Written Opinion dated Sep. 16, 2019, in Application No. PCT/US2019/028925.
International Search Report dated Dec. 4, 2018 in Application No. PCT/US2018/040898.
Jeon JY et al., "Efficient Preparation of Styrene Block Copolymer Anion Exchange Membranes via One-Step Friedel-Crafts Bromoalkylation with Alkenes," Organic Process Research & Development, 2019, 23(8), 1580-1586.
Jeon JY et al., "Functionalization of Syndiotactic Polystyrene via Superacid-Catalyzed Friedel-Crafts Alkylation," Topics in Catalysis, 2018, 61(7-8), 610-615.
Jeon, J.Y., et al., "Ionic Functionalization of Polystyrene-b-poly(Ethylene-co-butylene)-b-polstyrene via Friedel-crafts Bromoalkylation and Its Application for Anion Exchange Membranes," ECS Transactions, Aug. 24, 2017, vol. 80, No. 8, pp. 967-970, XP055507090.
Jeon JY et al., "Synthesis of aromatic anion exchange membranes by Friedel-Crafts bromoalkylation and cross-linking of polystyrene block copolymers," Macromolecules, 2019, 52(5), 2139-2147.
Jia W et al., "Gas transport characteristics of fluorinated polystyrene-b-polybutadiene-b-polystyrene (F-SBS)," Journal of Membrane Science, 2019, 591, 117296 (24 pp.).
Jo TS et al., "Highly efficient incorporation of functional groups into aromatic main-chain polymer using iridium-catalyzed C—H activation and Suzuki-Miyaura reaction," Journal of the American Chemical Society 131,2009, (5), 1656-1657.
Jo TS et al., "Synthesis of quaternary ammonium ion-grafted polyolefins via activation of inert C—H bonds and nitroxide mediated radical polymerization," Journal of Polymer Science Part A: Polymer Chemistry, 2009, 47(18), 4519-4531.
Jo TS et al., "Synthesis of sulfonated aromatic poly(ether amide) s and their application to proton exchange membrane fuel cells," Journal of Polymer Science Part A: Polymer Chemistry, 2009, 47(2), 485-496.
JP H06188005A: Online Translation of Abstract, Claims, and Detailed Description of retrieved from ESPACENET on Feb. 10, 2021 (20 pp.).
JP Notice of Refusal dated Dec. 15, 2020 for Application No. 2020-008602.
JP Notice of Refusal dated May 7, 2020 for Application No. 2017-526894.
JP Notice of Refusal dated Oct. 18, 2019 for Application No. 2017-526894.
JP Search Report by Authorized Searching Authority dated Nov. 17, 2020 for Application No. 2020-008602.
JP Search Report by Authorized Searching Authority dated Sep. 18, 2018 for Application No. 2017-526894.
Kazakova, et al., "Trifluoromethanesulfonic Acid in Organic Synthesis," Russian Journal of Organic Chemistry, 2017, vol. 53, No. 4, pp. 485-509.
Kim E et al., "Nanoscale building blocks for the development of novel proton exchange membrane fuel cells," The Journal of Physical Chemistry B, 2008, 112(11), 3283-3286.
Kim JH et al., "Fabrication of dense cerium pyrophosphate-polystyrene composite for application as low-temperature proton-conducting electrolytes," Journal of The Electrochemical Society, 2015, 162(10), F1159-F1164.
Kim S et al., "A Novel Sulfonated Aromatic Polymer Membrane with Different Pendant Groups for Vanadium Redox Flow Batteries (VRFBs)," 2018 AIChE Annual Meeting, 2018, 103g (3 pp.).
Kim S et al., "Novel Sulfonated Aromatic Polymer Membranes for Breaking the Coulombic and Voltage Efficiency Trade-Off Limitation in Vanadium Redox Flow Battery," 236th ECS Meeting (Oct. 13-17, 2019), ECS Meeting Abstracts, 2019, MA2019-02, 565 (2 pp.).
Kim YS, "Advanced Materials for Fully-Integrated MEAs in AEMFCs," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc146_kim_2018_o.pdf (last accessed Dec. 15, 2020), 25 pp.
Kim YS, "Scalable Elastomeric Membranes for Alkaline Water Electrolysis," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/p159_kim_2019_o.pdf (last accessed Dec. 15, 2020), 22 p.
Kim YS, "Scalable Elastomeric Membranes for Alkaline Water Electrolysis," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p159_kim_2020_p.pdf (last accessed Dec. 15, 2020), 29 pp.
Kim YS et al., "A New Class of Fuel Cells Based on Ion Pair-Coordinated Proton Exchange Membranes," 232nd ECS Meeting (Oct. 1-5, 2017), ECS Meeting Abstracts, 2017, MA2017-02, 1470 (2 pp.).
Kim YS et al., "Scalable Elastomeric Membranes for Alkaline Water Electrolysis," presented at the 2018 U.S. Department of Energy (DOE) Hydrogen and Fuel Cells Program Annual Merit Review and Peer Evaluation Meeting on Jun. 13-15, 2018 in Washington, D.C., accessible at https://www.hydrogen.energy.gov/pdfs/review18/pd159_kim_2018_p.pdf (last accessed Dec. 15, 2020), 23 pp.
Kim YS et al., "HydroGEN Seedling: Scalable Elastomeric Membranes for Alkaline Water Electrolysis," in 2018 Annual Progress Report: DOE Hydrogen and Fuel Cells Program, U.S. Department of Energy, Document No. DOE/GO-102019-5156, Apr. 2019, accessible at https://www.hydrogen.energy.gov/pdfs/progress18/h2f_kim_2018.pdf (last accessed Dec. 15, 2020), 4 pp.
Kim YS, "Polymer-based fuel cells that operate from 80-220°C," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc175_kim_2018_o.pdf (last accessed Dec. 15, 2020), 24 pp.
Kimura, K.W., et al., "Selective Electrochemical C02 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Ko K et al., "Effect of Temperature on Nanophase-segregation and Transport in Polysulfone-Based Anion Exchange Membrane Fuel Cell: Molecular Dynamics Simulation Approach," Bulletin of the American Physical Society, 2013, 58(1), H1.307 (1 p.).
Kraglund MR et al., "Ion-solvating membranes as a new approach towards high rate alkaline electrolyzers," Energy & Environmental Science, 2019, 12, 3313-3318.
Kraglund MR et al., Supplementary information for "Ion-solvating membranes as a new approach towards high rate alkaline electrolyzers," Energy & Environmental Science, 2019, 12, 3313-3318 (19 pp.).
Kreuer KD, "On the development of proton conducting polymer membranes for hydrogen and methanol fuel cells," Journal of Membrane Science, 2001, 185, 29-39.
Le TP et al., "Miscibility and acid strength govern contact doping of organic photovoltaics with strong polyelectrolytes," Macromolecules, 2015, 48(15), 5162-5171.
Lee WH et al., "Fluorene-based hydroxide ion conducting polymers for chemically stable anion exchange membrane fuel cell," ACS Macro Letters, 2015, 4(4), 453-457.

(56) References Cited

OTHER PUBLICATIONS

Lee WH et al., "Molecular Engineering of Aromatic Polymer Electrolytes for Anion Exchange Membranes," ECS Transactions, 2017, 80(8), 941-944.

Lee WH et al., "Molecular Engineering of Ion-Conducting Polymers for Fuel Cell Membrane Applications," ECS Transactions, 2015, 69(17), 357-361.

Lee WH et al., "Poly (terphenylene) anion exchange membranes: the effect of backbone structure on morphology and membrane property," ACS Macro Letters, 2017, 6(5), 566-570.

Lee WH et al. "Robust Hydroxide Ion Conducting Poly(biphenyl)s for Alkaline Fuel Cell Membranes," ACS Macro Letters, 2015, 4(8), 814-818.

Lee WH et al., Supporting Information for "Robust Hydroxide Ion Conducting Poly(biphenyl)s for Alkaline Fuel Cell Membranes," ACS Macro Letters, 2015, 4(8), 814-818 (pp. 1-16).

Lee YB et al., "Effect of Ammonium Ion Structures on Properties of Alkaline Exchange Membrane Fuel Cells," ECS Transactions, 2010, 33(1), 1889-1892.

Lee YB et al., "Novel Synthetic Approach and their Properties for Alkaline Exchange Polysulfone Membranes," 2011 ECS Meeting Abstracts, MA2011-02, 866 (2 pp.).

Leng Y et al., "Solid-State Water Electrolysis with an Alkaline Membrane," Journal of the American Chemical Society, 2012, 134, 9054-9057.

Leng Y et al., Supporting Information for "Solid-State Water Electrolysis with an Alkaline Membrane," Journal of the American Chemical Society, 2012, 134, 9054-9057 (13 pp.).

Leonard DP et al., "Asymmetric electrode ionomer for low relative humidity operation of anion exchange membrane fuel cells," Journal of Materials Chemistry A, 2020, 8(28), 14135-14144.

Luo X et al., "Mesoscale Simulations of Quaternary Ammonium-Tethered Triblock Copolymers: Effects of the Degree of Functionalization and Styrene Content," Journal of Physical Chemistry C, 2020, 124(30), 16315-16323.

Matanovic I et al., "Adsorption of polyaromatic backbone impacts the performance of anion exchange membrane fuel cells," Chemistry of Materials, 2019, 31(11), 4195-4204.

Maurya S et al., "On the origin of permanent performance loss of anion exchange membrane fuel cells: Electrochemical oxidation of phenyl group," Journal of Power Sources, 2019, 436, 226866.

Maurya S et al., "Polyaromatic Ionomers for High Performance Alkaline Membrane Fuel Cells," ECS Meeting Abstracts, 2019, MA2019-02, 1572 (3 pp.).

Maurya S et al., "Rational design of polyaromatic ionomers for alkaline membrane fuel cells with 1 W cm-2 power density," Energy & Environmental Science, 2018, 11(11), 3283-3291.

Maurya S et al., "Surface adsorption affects the performance of alkaline anion-exchange membrane fuel cells," ACS Catalysis, 2018, 8(10), 9429-9439.

Meek KM et al., "High-Throughput Anion Exchange Membrane Characterization at NREL," ECS Transactions, 2019, 92(8), 723-731.

Mittelsteadt C et al., "Dimensionally Stable High Performance Membranes," presented at the 2016 U.S. Department of Energy (DOE) Hydrogen and Fuel Cells Program and Vehicle Technologies Office Annual Merit Review and Peer Evaluation Meeting on Jun. 6-10, 2019 in Washington, D.C., accessible at https://www.hydrogen.energy.gov/pdfs/review16/fc150_mittelsteadt_2016_p.pdf (last accessed Dec. 15, 2020), 19 pp.

Mochizuki T et al., "Simple, Effective Molecular Strategy for the Design of Fuel Cell Membranes: Combination of Perfluoroalkyl and Sulfonated Phenylene Groups," ACS Energy Letters, 2016, 1(2), 348-352 (Abstract and Supporting Information only, 11 pp.).

Mohanty AD et al., "Anion Exchange Fuel Cell Membranes Prepared from C-H Borylation and Suzuki Coupling Reactions," Macromolecules, 2014, 47, 1973-1980.

Mohanty AD et al., "Mechanistic analysis of ammonium cation stability for alkaline exchange membrane fuel cells," Journal of Materials Chemistry A, 2014, 2(41), 17314-17320.

Mohanty AD et al., "Stable Elastomeric Anion Exchange Membranes Based on Quaternary Ammonium-Tethered Polystyrene-b-poly(ethylene-co-butylene)-b-polystyrene Triblock Copolymers," Macromolecules, 2015, 48(19), 7085-7095.

Mohanty AD et al., "Thermochemical stability study of alkyl-tethered quaternary ammonium cations for anion exchange membrane fuel cells," Journal of the Electrochemical Society, 2017, 164(13), F1279-F1285.

Mohanty AD et al., "Transition Metal-Catalyzed Functionalization of Polyolefins Containing C—C, C=C, and C—H Bonds," Advances in Organometallic Chemistry, 2015, 64, 1-39.

Mohanty AD et al., "Systematic alkaline stability study of polymer backbones for anion exchange membrane applications," Macromolecules, 2016, 49(9), 3361-3372.

Mohanty AD et al., "Systematic Analysis of Cation Stability in Alkaline Exchange Membrane Fuel Cells," ECS Transactions, 2014, 64(3), 1221-1228.

Noh S et al., "Molecular engineering of hydroxide conducting polymers for anion exchange membranes in electrochemical energy conversion technology," Accounts of Chemical Research, 2019, 52(9), 2745-2755.

Norsten TB et al., "Highly fluorinated comb-shaped copolymers as proton exchange membranes (PEMs): improving PEM properties through rational design," Advanced Functional Materials, 2006, 16, 1814-1822.

Notice of Allowance dated Nov. 22, 2021 in U.S. Appl. No. 16/553,965.

Office Action dated May 25, 2021, in U.S. Appl. No. 16/788,506.

Notice of Allowance dated May 29, 2019, in U.S. Appl. No. 15/527,967.

Office Action dated Feb. 25, 2021, in U.S. Appl. No. 16/471,358.

Office Action dated Jan. 6, 2021, for U.S. Appl. No. 16/628,879.

Office Action dated May 25, 2021, in U.S. Appl. No. 16/553,965.

Office Action dated Sep. 10, 2020, in U.S. Appl. No. 16/471,358.

Pagels M et al., "Synthetic Approach to Hydrocarbon Proton Exchange Membranes Using Anion Exchange Membrane Precursors," ECS Meeting Abstracts, 2020, MA2020-02, 2237 with Presentation (19 pp.).

Pagels MK et al., "One-Pot Synthesis of Proton Exchange Membranes from Anion Exchange Membrane Precursors," ACS Macro Letters, 2020, 9(10), 1489-1493.

Pagels MK et al., Supporting Information for "One-Pot Synthesis of Proton Exchange Membranes from Anion Exchange Membrane Precursors," ACS Macro Letters, 2020, 9(10), 1489-1493 (14 pp.).

Pagels MK et al., "Synthesis of anion conducting polymer electrolyte membranes by Pd-Catalyzed Buchwald-Hartwig Amination coupling reaction," Tetrahedron, 2019, 75(31), 4150-4155.

Park EJ, "Chemically durable polymer electrolytes for solid-state alkaline water electrolysis," Journal of Power Sources, 2018, 375, 367-372.

Park EJ et al., "Dimethyl Substituted Polyaromatic Alkaline Ionomers for Better Alkaline Hydrogen Oxidation," ECS Meeting Abstracts, 2018, MA2018091, 1753 (3 pp.).

Park EJ et al., "How does a small structural change of anode ionomer make a big difference in alkaline membrane fuel cell performance?," Journal of Materials Chemistry A, 2019, 7(43), 25040-25046.

Park EJ et al., "Superacidic porous polymer catalyst and its application in esterification of carboxylic acid," Structural Chemistry, 2017, 28(2), 493-500.

Park EJ et al., "Versatile functionalization of aromatic polysulfones via thiol-ene click chemistry," Journal of Polymer Science Part A: Polymer Chemistry, 2016, 54(19), 3237-3243.

Park IS et al., "Sulfonated Polyamide Based IPMCs," Proceedings of SPIE, Electroactive Polymer Actuators and Devices (EAPAD) 2009, 7287, 72870X.

Park J et al., "A comparison study of ionic polymer-metal composites (IPMCs) fabricated with Nafion and other ion exchange membranes," Proceedings of SPIE, Electroactive Polymer Actuators and Devices (EAPAD) 2013, 8687, 868714.

(56) References Cited

OTHER PUBLICATIONS

Park J et al., "Electromechanical performance and other characteristics of IPMCs fabricated with various commercially available ion exchange membranes," Smart materials and structures, 2014, 23(7), 074001.

Parrondo J et al., "Synthesis and Alkaline Stability of Solubilized Anion Exchange Membrane Binders Based on Poly(phenylene oxide) Functionalized with Quaternary Ammonium Groups via a Hexyl Spacer," Journal of The Electrochemical Society, 2015, 162, F1236-F1242.

Pena, E.R., et al., "Factors Enhancing the Reactivity of Carbonyl Compounds for Polycondensations with Aromatic Hydrocarbons. A Computational Study," Macromlecules, 2004, 37(16), 6227-6235.

Perret R et al., "IV.F.4 Hydrogen Fuel Cells and Storage Technology Project," in 2008 Annual Progress Report: DOE Hydrogen Program, U.S. Department of Energy, accessible at https://www.hydrogen.energy.gov/pdfs/progress08/iv_f_4_perret.pdf (last accessed Dec. 15, 2020), pp. 776-786.

Perret R et al., "IV.G.1 Hydrogen Fuel Cells and Storage Technology Project (FCAST)," in 2007 Annual Progress Report: DOE Hydrogen Program, U.S. Department of Energy, accessible at https://www.hydrogen.energy.gov/pdfs/progress07/iv_g_1_perret.pdf (last accessed Dec. 15, 2020), pp. 638-647.

Perret R et al., "IV.G.4 Fundamental Research for Optimization of Hydrogen Storage and Utilization," in 2006 Annual Progress Report: DOE Hydrogen Program, U.S. Department of Energy, accessible at https://www.hydrogen.energy.gov/pdfs/progress06/iv_g_4_perret.pdf (last accessed Dec. 15, 2020), pp. 575-581.

Perret R et al., "IV.H.5 Hydrogen Fuel Cells and Storage Technology Project," in 2009 Annual Progress Report: DOE Hydrogen Program, U.S. Department of Energy, accessible at https://www.hydrogen.energy.gov/pdfs/progress09/iv_h_5_perret.pdf (last accessed Dec. 15, 2020), pp. 801-807.

Powers W et al., "Borylation of Polystyrene: Random Blocky vs. Truly Random Copolymers," Bulletin of the American Physical Society, 2009, 54(1), C1.089 (1 p.).

Sepehr, F., et al., "Mesoscale Simulations of Anion Exchange Membranes Based on Quaternary Ammonium Tethered Triblock Copolymers," Macromolecules, Jun. 5, 2017, vol. 50, pp. 4397-4405, XP055564626.

Shin D et al., "Ch. 8: Anion Exchange Membranes: Stability and Synthetic Approach," in The Chemistry of Membranes Used in Fuel Cells: Degradation and Stabilization, S. Schlick (eds.), Wiley, 2018, pp. 195-228.

Shin J et al., "A new homogeneous polymer support based on syndiotactic polystyrene and its application in palladium-catalyzed Suzuki-Miyaura cross-coupling reactions," Green Chemistry, 2009, 11(10), 1576-1580.

Shin J et al., "Borylation of Polystyrene," Synfacts 2008 (2), 145.

Shin J et al., "Controlled Functionalization of Crystalline Polystyrenes via Activation of Aromatic C-H Bonds," Macromolecules, 2007, 40(24), 8600-8608.

Shin J et al., "Hydrophilic functionalization of syndiotactic polystyrene via a combination of electrophilic bromination and Suzuki-Miyaura reaction," Journal of Polymer Science Part A: Polymer Chemistry, 2010, 48(19), 4335-4343.

Shin J et al., "Hydrophilic graft modification of a commercial crystalline polyolefin," Journal of Polymer Science Part A: Polymer Chemistry, 2008, 46(11), 3533-3545.

Sivakami JN et al.," 'Kick-started' oxetanes in photoinitiated cationic polymerization: scale-up synthesis and structure-property studies," Proceedings of RadTech International UV & EB Technology Expo & Conference (held on May 15-18, 2016 in Chicago, IL), 2016, 5 pp.

Smedley SB et al., "Measuring water hydrogen bonding distributions in proton exchange membranes using linear Fourier Transform Infrared spectroscopy," Solid State Ionics, 2015, 275, 66-70.

Smedley SB et al., "Spectroscopic Characterization of Sulfonate Charge Density in Ion-Containing Polymers," The Journal of Physical Chemistry B, 2017, 121(51), 11504-11510.

Tian D et al., "Phosphoric Acid-Doped Biphenyl-Backbone Ion-Pair Coordinated Pems with Broad Relative Humidity Tolerance," ECS Meeting Abstracts, 2020, MA2020-02, 2240 (2 pp.).

Tian D et al., "Phosphoric Acid-Doped Ion-Pair Coordinated PEMs with Broad Relative Humidity Tolerance," Energies, 2020, 13(8), 1924 (14 pp.).

Tian D et al., "Structure and gas transport characteristics of triethylene oxide-grafted polystyrene-b-poly(ethylene-co-butylene)-b-polystyrene," Journal of Polymer Science 2020, 58(18), 2654-2663.

Trant C et al., "Impact of Microstructured Morphology on Macroscale Properties of SemiCrystalline Triblock Copolymer Anion Exchange Membranes," ECS Meeting Abstracts, 2020, MA2020-01,2267 (2 pp.).

Trant C et al., "Synthesis and Characterization of Anion-Exchange Membranes Using Semicrystalline Triblock Copolymers in Ordered and Disordered States," Macromolecules 2020, 53(19), 8548-8561.

U.S. Corrected Notice of Allowability dated Dec. 27, 2021, in U.S. Appl. No. 16/553,965.

U.S Corrected Notice of Allowability dated Dec. 15, 2021 in U.S. Appl. No. 16/788,506.

U.S. Final Office Action dated Sep. 3, 2021, in U.S. Appl. No. 16/553,965.

U.S. Non-Final Office Action dated Oct. 14, 2021 in U.S. Appl. No. 16/842,037.

U.S. Notice of Allowance dated Sep. 8, 2021, in U.S. Appl. No. 16/788,506.

U.S. Notice of Allowance dated Sep. 15, 2021, in U.S. Appl. No. 16/788,506.

U.S. Appl. No. 17/309,401, inventors Bae et al., filed on May 25, 2021.

U.S. Restriction Requirement dated Jan. 6, 2022, in U.S. Appl. No. 16/471,358.

Velasco VM et al., "Novel Aromatic Polymers with Pentafluorophenyl Pendant Groups," Macromolecules, 2008, 41, 8504-8512.

Walgama R et al., "The Effect of Backbone Structure on Functional Properties in Anion Exchange Membranes; Comparison of Poly (fluorene) with Poly (biphenylene) and Poly (terphenylene)s," ECS Meeting Abstracts, 2020, MA2020-02, 2268 (3 pp.).

Wang J et al.," Poly(aryl piperidinium) membranes and ionomers for hydroxide exchange membrane fuel cells," Nature Energy, 2019, 4, 392-398.

Wang J et al., Supplementary Information for" Poly(aryl piperidinium) membranes and ionomers for hydroxide exchange membrane fuel cells," Nature Energy, 2019, 4, 392-398 (13 pp.).

Wang T et al., "Poly (terphenylene) anion exchange membranes with high conductivity and low vanadium permeability for vanadium redox flow batteries (VRFBs)," Journal of Membrane Science, 2020, 598, 117665.

Wang T et al., Supplementary Information for "Suppressing vanadium crossover using sulfonated aromatic ion exchange membranes for high performance flow batteries," Materials Advances, 2020, 1(7), 2206-2218 (15 pp.).

Wang T et al., "Suppressing vanadium crossover using sulfonated aromatic ion exchange membranes for high performance flow batteries," Materials Advances, 2020, 1(7), 2206-2218.

Week PF et al., "Nanoscale building blocks for the development of novel proton-exchange membranes fuel cells: A first-principles study," Bulletin of the American Physical Society, 2008, 53(2), C1.095 (1 p.).

Wi SN et al., "Study of Water Dynamics in Superacidic Hydrocarbon Proton Exchange Membranes Using Solid-State and Pulsed-Field Gradient NMR Spectroscopy," National High Magnetic Field Laboratory 2015 Annual Research Report, 2015 (1 p.).

Xu H, "Novel Fluorinated Ionomer for PEM Fuel Cells," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc185_xu_2018_p.pdf (last accessed Dec. 15, 2020), 15 pp.

Xu Z et al., "A thermally healable polyhedral oligomeric silsesquioxane (POSS) nanocomposite based on Diels-Alder chemistry," Chemical Communications, 2013, 49, 3 pp.

(56) References Cited

OTHER PUBLICATIONS

Yang ZT et al., "Photoinitiated cationic polymerization of sustainable epoxy and oxetane thermosets," Proceedings of RadTech International UV & EB Technology Expo & Conference (held on May 15-18, 2016 in Chicago, IL), 2016, 5 pp.

Yim W et al., "Development of Ultrafiltration Membrane-Separation Technology for Energy-Efficient Water Treatment and Desalination Process," Final Report for DOE Award No. DE-SC0005062, 2016, 18 pp.

Yin Z et al., "An alkaline polymer electrolyte C02 electrolyzer operated with pure water," Energy & Environmental Science, 2019, 12, 2455-2462.

Yin Z et al., Supporting Information for "An alkaline polymer electrolyte CO2 electrolyzer operated with pure water," Energy & Environmental Science, 2019, 12, 2455-2462 (7 pp.).

Yokota et al., "Anion Conductive Aromatic Block Copolymers Continuing Diphenyl Ether or Sulfide Groups for Application to Alkaline Fuel Cells," vol. 6, No. 19, Oct. 8, 2014, pp. 17044-17052.

Yoshimura K et al., "Aromatic Polymer with Pendant Perfluoroalkyl Sulfonic Acid for Fuel Cell Applications," Macromolecules, 2009, 42(23), 9302-9306 (Abstract and Supporting Information only, 8 pp.).

Zelovich T et al., "Ab initio molecular dynamics study of hydroxide diffusion mechanisms in nanoconfined structural mimics of anion exchange membranes," The Journal of Physical Chemistry C, 2019, 123(8), 4638-4653.

Zelovich T et al., "Anion Exchange Membranes with Low Hydration Conditions from an Ab Initio Molecular Dynamics Perspective," ECS Meeting Abstracts, 2019, MA2019-01, 1957 (2 pp.).

Zelovich T et al., "Hydroxide ion diffusion in anion-exchange membranes at low hydration: insights from ab initio molecular dynamics," Chemistry of Materials, 2019 31(15), 5778-5787.

Zeng QH et al., "Anion exchange membranes based on quaternized polystyrene-block-poly(ethylene-ran-butylene)-block-polystyrene for direct methanol alkaline fuel cells," Journal of Membrane Science, 2010, 349(1-2), 237-243.

Zhu L et al., "Effects of tertiary amines and quaternary ammonium halides in polysulfone on membrane gas separation properties," Journal of Polymer Science Part B: Polymer Physics, 2018, 56(18), 1239-1250.

Goseki, R et al., "Synthesis of a well-defined alternating copolymer of 1,1-diphenylethylene and tert-butyldimethylsilyloxymethyl substituted styrene by anionic copolymerization: toward tailored graft copolymers with controlled side chain densities," Polymer Chemistry, vol. 10, No. 47, 6413-6422, Dec. 2019.

Victor M. Velasco, Mikhail G. Zolotukhin, Maria Teresa Guzmán-Gutiérrez, Salvador Lopez Morales, Serguei Fomine, Maria P. Carreén-Castro, Manufi Salmón, and Ullrich Scherf. Novel Aromatic Polymers with Pentafluorophenyl Pendent Groups. Macromolecules 2008 41 (22), 8504-8512. DOI 10.1021/ma8016162.

Ji Young Chang, Shin Whan Lee, Phil Jeung Park, and Man Jung Han. Synthesis of a Linear Phenolic Polymer by an Aromatic Electrophilic Substitution Reaction. Macromolecules 1997 30 (25), 8075-8077. DOI: 10.1021/na970479o.

Lilian I. Olvera, Maria T. Guzmán-Gutiérrez, Mikhail G. Zolotukhin, Sergei Fomine, Jorge Cárdenas, Fransico A. Ruiz-Trevino, Didier Villers, Tiberio A. Ezquerra, and Evgen Prokhorov. Novel High Molecular Weight Aromatic Fluorinated Polymers from One-Pot, Metal-Free Step Polymerizations. Macromolecules 2013 46 (18), 7245-7256. DOI: 10.1021/ma401306s.

M. Carmen G. Hernandez, Mikhail G. Zolotukhin, Serguei Fomine, Gerardo Cedillo, Salvador L. Morales, Nils Fröhlich, Eduard Preis, Ullrich Scherf, Manuel Salmón, Maria Isabel Chávez, Jorge Cárdenas, and Alberto Ruiz-Trevino. Novel, Metal-Free, Superacid-Catalyzed "Click" Reactions of Isatins with Linear, Nonactivated, Multiring Aromatic Hydrocarbons. Macromolecules 2010 43 (17), 5968-6979. DOI: 10.1021/ma101048z.

Alfredo R. Cruz, M. Carmen G. Hernandez, Maria T. Guzman-Gutierrez, Mikhail G. Zolotukhin, Sergei Fomine, Salvador L. Morales, Hans Kricheldorf, Edward S. Wilks, Jorge Cárdenas, and Manuel Salmón. Precision Synthesis of Narrow Polydispersity, Ultrahigh Molecular Weight Linear Aromatic Polymers by A2 + B2 Nonstoichiometric Step-Selective Polymerization. Macromolecules 2012 45 (17), 6774-6780. DOI: 10.1021/ma301691f.

R. E. Florin. Catalyst Specificity in Friedel-Crafts Copolymerization. Journal of the American Chemical Society 1951 73 (9), 4468-4470. DOI: 10.1021/ja01153a516.

J. George, H. Mark, and H. Wechsler. Inhibition of Friedel—Crafts Polymerization.1. II. Factors Affecting Inhibitor Power. Journal of the American Chemical Society 1950 72 (9), 3896-3901. DOI: 10.1021/ja01165a019.

J. George, H. Wechsler, and H. Mark. Inhibition of Friedel—Crafts Polymerization 1. I. The Mechanism of Inhibition. Journal of American Chemical Society 1950 72 (9), 3891-3896. DOI: 10 1021/ja01165a018.

Cai, M., Zhu, M. and Yu, Y. (2009), Synthesis and characterization of poly(ether ketone ether ketone ketone)/poly(ether ether ketone ketone) copolymers containing naphthalene and pendant cyano groups. J. Appl. Polym. Sci., 112:3225-3231. https://doi.org/10.1002/app.29792.

Yong-Chul Jeong, Dae Gyu Park, Eunkyoung Kim, Sung Ik Yang, and Kwang-Hyun Ahn. Polymerization of a Photochromic Diarylethene by Friedel-Crafts Alkylation. Macromolecules 2006 39 (9), 3106-3109. DOI: 10.1021/ma0602167.

Mallkpour, S.E. and Butler, G.B. (1987), Polymerization of N-methylpyrrole with bis-triazolinediones via electrophilic aromatic substitution. J. Polym. Sci. A Polym. Chem., 25:2781-2790. https://doi.org/10.1002/pola.1987.080251013.

Fritz, A. and Rees, R.W. (1972), Synthesis of aryleneisopropylidene polymers. J. Polym. Sci. A-1 Polym. Chem., 10: 2365-2378 https://doi.org/10 1002/pol 1972.150100814.

R. A. Glendinning, D. R. Kelsey, J. H. Botkin, P. A. Winslow, M. Youssefi, R. J. Cotter, M. Matzner, and G. T. Kwiatkowski. Poly(aryl ether ketone) block and chain-extended copolymers. 1. Preparation and characterization of a new class of functional poly(aryl ether ketone) oligomers. Macromolecules 1993 26 (9), 2361-2365. DOI: 10.1021/ma00061a031.

Liu, Zheng-Dong & Chang, Yongzheng & Ou, Changjin & Jinyi, Lin & Xie, Ling-Hai & Yin, Cheng-Rong & Yi, Ming-Deng & Qian, Yan & Shi, Nai-En & Huang, Wei (2011). BF3-Et20-mediated Friedel-Crafts C—H bond polymerization to synthesize π-conjugation-interrupted polymer semiconductors. Polym. Chem.. 2. 2179-2182. 10.1039/C1PY00203A.

Nystuen, N.J. and Jones, M.B. (1985), Friedel-Crafts polymerization of fluorene with methylene chloride, methoxyacetyl chloride, and chloromethyl methyl ether. J. Polym. Sci. Polym. Chem. Ed., 23: 1433-1444. https://doi.org/10.1002/pol.1985.170230516.

C. F. H. Tipper and D. A. Walker. 268. Some reactions of cyclopropane and a comparison with the lower blefins. Part IV. Friedel-Crafts polymerization. J. Chern. Soc., 1959,1352-1359.

Howard M. Colquhoun, Mikhail G. Zolotukhin, Leonard M. Khalilov, and Usein M. Dzhemilev. Superelectrophiles in Aromatic Polymer Chemistry. Macromolecules 2001 34 (4), 1122-1124. DOI: 10.1021/ma001579o.

Yonezawa, N., Mori, SI., Miyata, S. et al. Electrophilic Aromatic Acylation Synthesis of Wholly Aromatic Polyketones Composed of 2,2'-Dimethoxybiphenylene Units. Polym J 35, 998-1002 (2003). https://doi.org/10.1295/polymj. 35.998.

Yonezawa, N., Okamoto, A. Synthesis of Wholly Aromatic Polyketones. Polym J 41, 899-928 (2009). https://doi.org/10.1295/polymj.PJ2007210.

Ho Lim, Min Chul Cha, and Ji Young Chang. Synthesis of microporous polymers by Friedel-Crafts reaction of 1-bromoadamantane with aromatic compounds and their surface modification Polym. Chern., 2012,3, 868-870.

Pepper, D. Friedel—Crafts Polymerizations. Nature 158, 789-790 (1946). https://doi.org/10.1038/158789b0.

Huang, B., Zhu, M. and Cai, M. (2011), Synthesis and characterization of poly(ether amide ether ketone)/poly(ether ketone ketone) copolymers. J. Appl. Polym. Sci, 119: 647-653. https://doi.org/10.1002/app 32723.

M.T. Guzmán-Gutiérrez, M.G. Zolotukhin, D. Fritsch, F.A. Ruiz-Treviño, G. Cedillo, E. Fregoso-Israel, C. Ortiz-Estrada, J. Chavez,

(56) References Cited

OTHER PUBLICATIONS

C. Kudla. Synthesis and gas transport properties of new aromatic 3F polymers. Journal of Membrane Science, vol. 323, Issue 2, 2008, pp. 379-385, ISSN 0376-7388, https://doi.org/10.1016/j.memsci.2008.06.041.

M. Teresa Guzmán-Gutiérrez, M. Humberto Rios-Dominguez, F. Alberto Ruiz-Treviñ, Mikhail G. Zolotukhin, Jorge Balmaseda, Detlev Fritsch, Evgen Prokhorov. Structure-properties relationship for the gas transport properties of new fluoro-containing aromatic polymers. Journal of Membrane Science, vols. 385-386, 2011, pp. 277-284, ISSN 0376-7388, https://doi.org/10.1016/j.memsci.2011.10.009.

Mallakpour, S.E. and Butler, G.B. (1989), Uncatalyzed polymerization of bistriazolinediones with electron-rich aromatic compounds via electrophilic aromatic substitution. J. Polym. Sci. A Polym. Chem., 27:217-235. https://doi.org/10.1002/pola.1989.080270119.

Guzman, Maria Teresa & Nieto, Danifi & Fomine, Serguei & Morales, Salvador & Zolotukhin, Mikhail & Hernandez, M. & Kricheldorf, Hans & Wilks, Edward. (2010). Dramatic Enhancement of Superacid-Catalyzed Polyhydroxyalkylation Reactions. Macromolecules. 44. 10.1021/ma102267f.

Diaz, A.M., Zolotukhin, M.G., Fomine, S., Salcedo, R., Manero, O., Cedillo, G., Velasco, V.M., Guzman, M.T., Fritsch, D. and Khalizov, A.F. (2007), A Novel, One-Pot Synthesis of Novel 3F, 5F, and 8F Aromatic Polymers. Macromol. Rapid Commun., 28:183-187. https://doi.org/10.1002/marc.200600656.

Maeyama, K., Tagata, Y. & Yonezawa, N. 2,2'-Bis(4-benzoylphenoxy)biphenyl: A Novel Efficient Acyl-acceptant Monomer Yielding Wholly Aromatic Polyketones via Friedel-Crafts Type Polymerization with Arenedicarbonyl Chloride. Polym J 36, 146-150 (2004). https://doi.org/10.1295/polymj.36.146.

Katsuya Maeyama, Yoshimasa Tagata, Hiroki Nishimori, Megumi Yamazaki, Satoshi Maruyama, Noriyuki Yonezawa. Effective synthesis of wholly aromatic polyketones using 2,2'-diaryloxybiphenyl and arenedicarboxylic acid derivatives via Friedel-Crafts type acylation polymerization. Reactive and Functional Polymers, vol. 61, Issue 1, 2004, pp. 71-79, ISSN 1381-5148, https://doi.org/10.1016/j.reactfunctpolym.2004.03.011.

Fox, C.J. and Johnson, A.L. (1965), The synthesis of polymers via acylation of triphenylamine. Makromol. Chem., 82: 53-59. https://doi.org/10.1002/macp.1965.020820106.

\* cited by examiner

THERMALLY STABLE HYDROCARBON-BASED ANION EXCHANGE MEMBRANE AND IONOMERS

CROSS REFERENCE TO RELATED APPLICATIONS

This application claims the benefit of U.S. Provisional Patent Application No. 62/992,230, filed on Mar. 20, 2020, which is incorporated herein by reference in its entirety.

STATEMENT REGARDING FEDERALLY SPONSORED RESEARCH AND DEVELOPMENT

This invention was made with U.S. Government support under Grant Number DOE-DE-AC52-06NA25396 awarded by U.S. Department of Energy. The United States Government has certain rights in the invention.

BACKGROUND

Fuel cell and water electrolyzer devices are important chemical-energy conversion devices for sustainable and renewable energy infrastructures. Currently, anion exchange systems for these applications are considered the most promising alternative to the proton exchange system due to its potentially low fabrication cost.

Ion exchange membranes such as anion exchange membranes (AEMs) allow transportation of anions (e.g., OH⁻, Cl⁻, Br⁻, etc.) across electrodes (cathode to anode and vice versa) in electrochemical reactions. By way of example, AEMs are one of the most critical components of fuel cells where hydrogen and oxygen are used to generate electricity and water by-product. They are also used in water electrolysis where water splits into hydrogen and oxygen with the help of electricity, which is the cleanest and the most desirable process of hydrogen production. Other areas of AEMs include electrochemical hydrogen compressors, batteries, sensors, and actuators (plastic membranes swing reversibly as a result of migration of ions). However, one of the major challenges for the industry remains the lack of low-cost and high-performance membranes for the anion exchange devices such as fuel cells and electrolyzers.

SUMMARY

Some embodiments of the present disclosure include an ion exchange membrane material including a polymer according to Formula I:

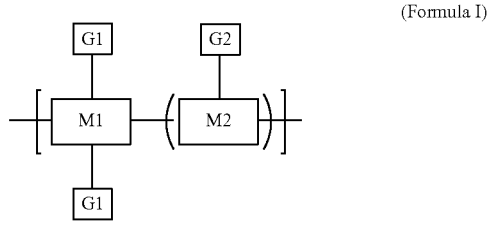

(Formula I)

In some embodiments, M1 is a diphenylalkylene, M2 is a styrene, G1 includes one or more ionic functional groups, hydrocarbyl groups, H, or combinations thereof, and G2 includes one or more ionic functional groups, hydrocarbyl groups, H, or combinations thereof. In some embodiments, the polymer includes the structure according to Formula II:

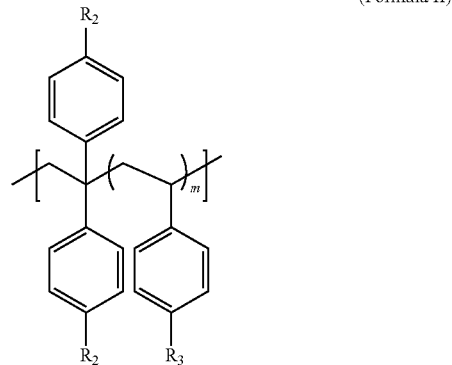

(Formula II)

In some embodiments, $R_2$ is H, an alkylated substrate, or combinations thereof, $R_3$ is H, a tert-butyl group, an alkylated substrate, or combinations thereof, and m is 1 or more. In some embodiments, the alkylated substrate includes a hydrocarbyl group and at least one ionic group. In some embodiments, the alkylated substrate includes one or more quaternary ammonium groups, one or more multication hydrocarbyl groups, one or more halide groups, or combinations thereof. In some embodiments, the alkylated substrate includes Formula III:

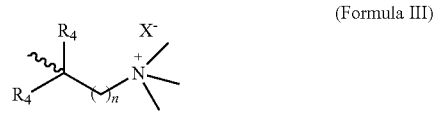

(Formula III)

In some embodiments, each $R_4$ includes H or a hydrocarbyl group, n=1 to about 20, and X includes one or more hydroxides, halides, or combinations thereof. In some embodiments, the percentage of $R_2$ and $R_3$ that are an alkylated substrate is between about 10% and about 100%.

Some embodiments of the present disclosure include a method of making an ion exchange membrane material including providing a reaction medium including diphenylalkylene and styrene, copolymerizing a polymer backbone from the diphenylalkylene and styrene, and reacting the polymer backbone to functionalize phenyl groups on the polymer backbone with a plurality of ionic functional groups. In some embodiments, reacting the polymer backbone to functionalize phenyl groups on the polymer backbone with a plurality of ionic functional groups includes chloromethylation, radical bromination, Friedel-Crafts acylation and alkylation, sulfonation followed by amination, or combinations thereof. In some embodiments, reacting the polymer backbone to functionalize phenyl groups on the polymer backbone with a plurality of ionic functional groups includes reacting the polymer backbone with one or more alkylated substrates, wherein the alkylated substrate includes a hydrocarbyl group and at least one ionic group. In some embodiments, the diphenylalkylene includes 1,1-diphenylethylene. In some embodiments, the styrene is substituted styrene, unsubstituted styrene, or combinations thereof.

Some embodiments of the present disclosure include a method of making an anion exchange membrane including providing a reaction medium including 1,1-diphenylethylene monomers and 4-tert-butylstyrene monomers, copolymerizing a polymer backbone including the 1,1-diphenylethylene monomers and 4-tert-butylstyrene monomers, grafting a plurality of functional groups to phenyl groups on the polymer backbone to achieve a degree of functionalization between about 10% and about 60%, and casting the polymer as an anion exchange membrane. In some embodiments, grafting a plurality of functional groups to phenyl groups on the polymer backbone includes chloromethylation, radical bromination, Friedel-Crafts acylation and alkylation, and sulfonation followed by amination, or combinations thereof. In some embodiments, the functional groups include alkylated substrates including a hydrocarbyl group and at least one ionic group. In some embodiments, the polymer has a structure according to Formula II:

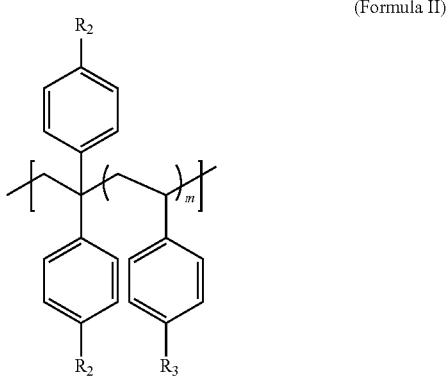

(Formula II)

In some embodiments, $R_2$ is H, an alkylated substrate, or combinations thereof, $R_3$ is a tert-butyl group, and m is 1 or more. In some embodiments, the alkylated substrate includes one or more quaternary ammonium groups, one or more multication hydrocarbyl groups, one or more halide groups, or combinations thereof. In some embodiments, the alkylated substrate includes Formula III:

(Formula III)

In some embodiments, each $R_4$ includes H or $CH_3$, n=1 to about 7, and X includes a hydroxide, a halide, or combinations thereof.

DETAILED DESCRIPTION

Figure 1:
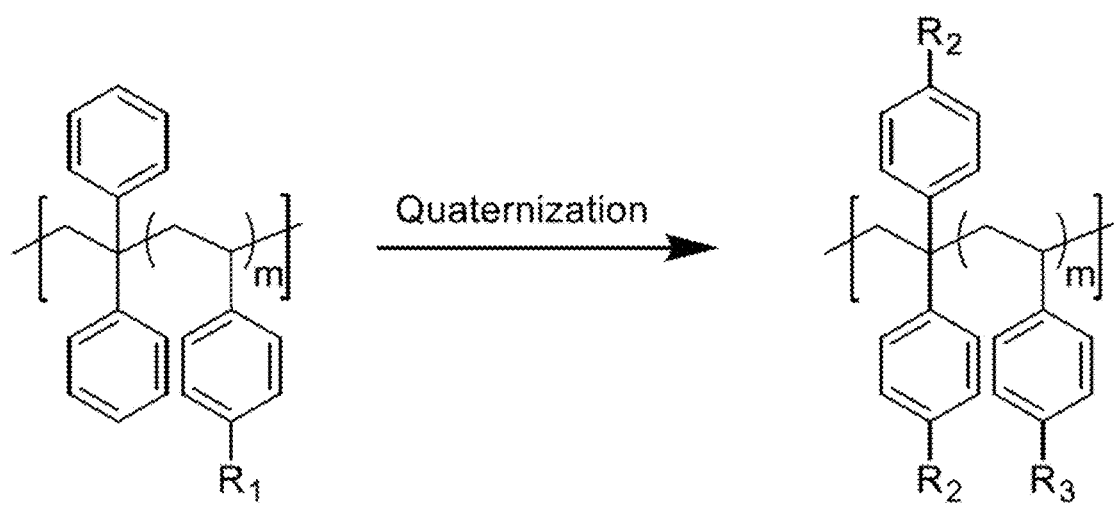
FIG. 1 is a schematic representation of a method of making an ion exchange membrane material according to some embodiments of the present disclosure.

Aspects of the disclosed subject matter include an ion exchange membrane material composed of one or more polymers. In some embodiments, the one or more polymers are copolymers or block copolymers. As will be discussed in greater detail below, in some embodiments, the copolymers are produced, in part, via a copolymerization reaction between one or more diphenylalkylene reaction components and one or more styrene reaction components. In some embodiments, the diphenylalkylene reaction component includes diphenylalkylene monomers, diphenylalkylene oligomers, diphenylalkylene polymers, or combinations thereof. In some embodiments, the diphenylalkylene reaction component includes substituted diphenylalkylene monomers, unsubstituted diphenylalkylene monomers, or combinations thereof. In some embodiments, the diphenylalkylene reaction component includes one or more functional groups. In some embodiments, the one or more functional groups include one or more ionic functional groups, i.e., a functional group including an ionic group. In some embodiments, the one or more functional groups include a hydrocarbyl group and at least one ionic group. As used herein, the term "hydrocarbyl" is used to refer to saturated and unsaturated hydrocarbon groups including 1 or more carbon atoms. The hydrocarbyl group can be acyclic, cyclic, or combinations thereof. The hydrocarbyl group can be branched or unbranched. The hydrocarbyl group can be unsubstituted or substituted with one or more functional groups. In some embodiments, one or both phenyl groups of the diphenylalkylene reaction component includes one or more functional groups. In some embodiments, the diphenylalkylene reaction component includes 1,1-diphenylethylene. In some embodiments, the styrene reaction component includes styrene monomers, styrene oligomers, styrene polymers, or combinations thereof. In some embodiments, the styrene reaction component includes substituted styrene, unsubstituted styrene, or combinations thereof. In some embodiments, the styrene reaction component includes one or more functional groups. In some embodiments, the phenyl group of the styrene reaction component includes one or more functional groups. In some embodiments, the one or more functional groups include one or more ionic functional groups, hydrocarbyl groups, or combinations thereof. In some embodiments, the one or more functional groups include a hydrocarbyl group and at least one ionic group. In some embodiments, the styrene reaction component includes 4-tert-butylstyrene. In some embodiments, the one or more polymers are functionalized with one or more functional groups during copolymerization, after copolymerization, or combinations thereof. In some embodiments, phenyl groups of the copolymers are with functionalized one or more functional groups, as will be discussed in greater detail below.

In some embodiments, the one or more polymers include the structure according to Formula I:

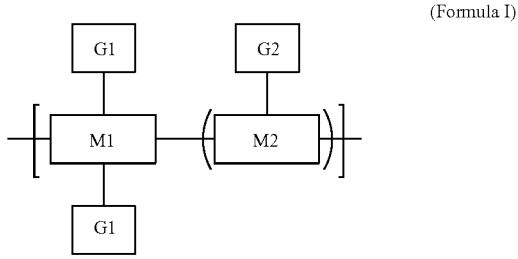

(Formula I)

In some embodiments, M1 is a diphenylalkylene. In some embodiments, M2 is a styrene. In some embodiments, G1 includes one or more ionic functional groups, hydrocarbyl groups, H, or combinations thereof. In some embodiments, G2 includes one or more ionic functional groups, hydrocarbyl groups, H, or combinations thereof.

In some embodiments, the one or more polymers include the structure according to Formula II:

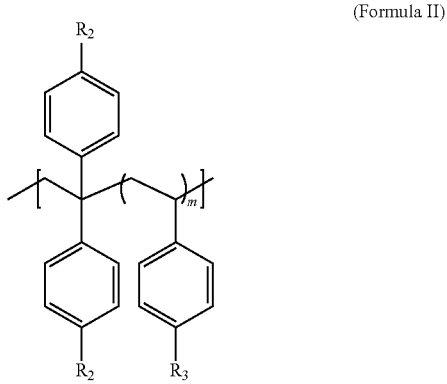

(Formula II)

In some embodiments, each $R_2$ is H, an alkylated substrate, or combinations thereof. In some embodiments, $R_3$ is H, a tert-butyl group, an alkylated substrate, or combinations thereof. In some embodiments, m is 1 or more. In some embodiments, m is 2, 3, 4, etc. In some embodiments, m is 10 or more. In some embodiments, m is 20 or more. In some embodiments, m is 30 or more. In some embodiments, m is 40 or more. In some embodiments, m is 50 or more. In some embodiments, m is 75 or more. In some embodiments, m is 100 or more. In some embodiments, in a network of polymers that include the structure of formula II, the value of m for adjacent repeating units varies. In some embodiments, alkylated substrates are substantially evenly distributed along the polymer. In some embodiments, the polymer has a degree of functionalization, i.e., the percentage of $R_2$ and $R_3$ that are an alkylated substrate, between about 10% and about 100%. In some embodiments, the polymer has a degree of functionalization between about 10% and about 60%.

In some embodiments, the alkylated substrate includes a hydrocarbyl group and at least one ionic group. In some embodiments, the alkylated substrate includes one or more quaternary ammonium groups, one or more multication hydrocarbyl groups, one or more halide groups, or combinations thereof. In some embodiments, the alkylated substrate includes Formula III:

(Formula III)

In some embodiments, each $R_4$ includes H or a hydrocarbyl group. In some embodiments, each $R_4$ includes H or $CH_3$. In some embodiments, n is between about 1 and about 20. In some embodiments, n is between about 1 and about 7. In some embodiments, X includes one or more hydroxides, halides, or combinations thereof.

In some embodiments, the alkylated substrate includes Formula IV:

(Formula IV)

In some embodiments, each $R_4$ includes H or a hydrocarbyl group. In some embodiments, each $R_4$ includes H or $CH_3$. In some embodiments, n is between about 1 and about 20. In some embodiments, n is between about 1 and about 7. In some embodiments, X includes a halide. In some embodiments, X includes Cl or Br. In some embodiments, polymers functionalized with alkylated substrates according to Formula IV are subjected to a substitution reaction with one or more tertiary amines in order to replace the halide groups and arrive at the structure according to Formula III. In some embodiments, halide ions present after the substitution reaction are replaced, e.g., with hydroxide ions via ionic exchange reaction.

In some embodiments, the polymer includes the structure according to Formula V:

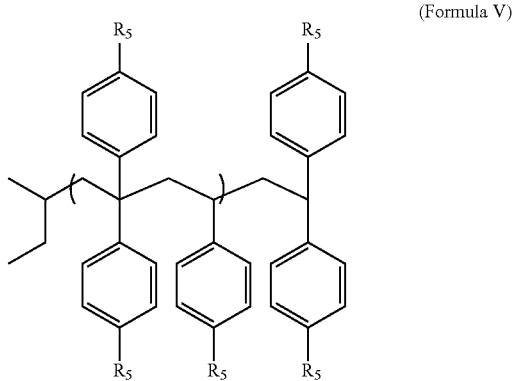

(Formula V)

In some embodiments, each $R_5$ is one of H, an alkylated substrate, or combinations thereof. In some embodiments, each $R_5$ is one of H, the structure according to Formula III, or combinations thereof. In some embodiments, X includes a hydroxide. In some embodiments, each $R_5$ is one of H, the structure according to Formula IV, or combinations thereof. In some embodiments, the polymer has a degree of functionalization between about 10% and about 100%. In some embodiments, the polymer has a degree of functionalization between about 10% and about 60%.

In some embodiments, the polymer includes the structure according to Formula VI:

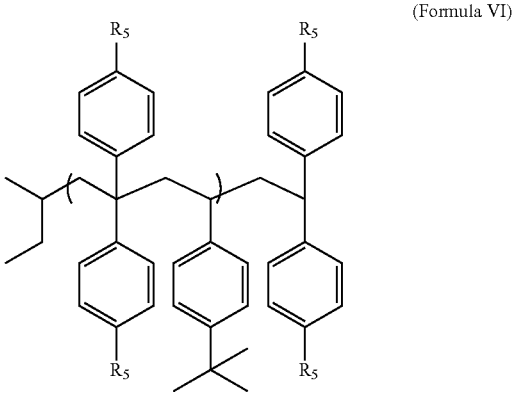

(Formula VI)

In some embodiments, each $R_5$ is one of H, an alkylated substrate, or combinations thereof. In some embodiments, each $R_5$ is one of H, the structure according to Formula III, or combinations thereof. In some embodiments, X includes a hydroxide. In some embodiments, each $R_5$ is one of H, the structure according to Formula IV, or combinations thereof. In some embodiments, the polymer has a degree of functionalization between about 10% and about 100%. In some embodiments, the polymer has a degree of functionalization between about 10% and about 60%.

Figure 2:
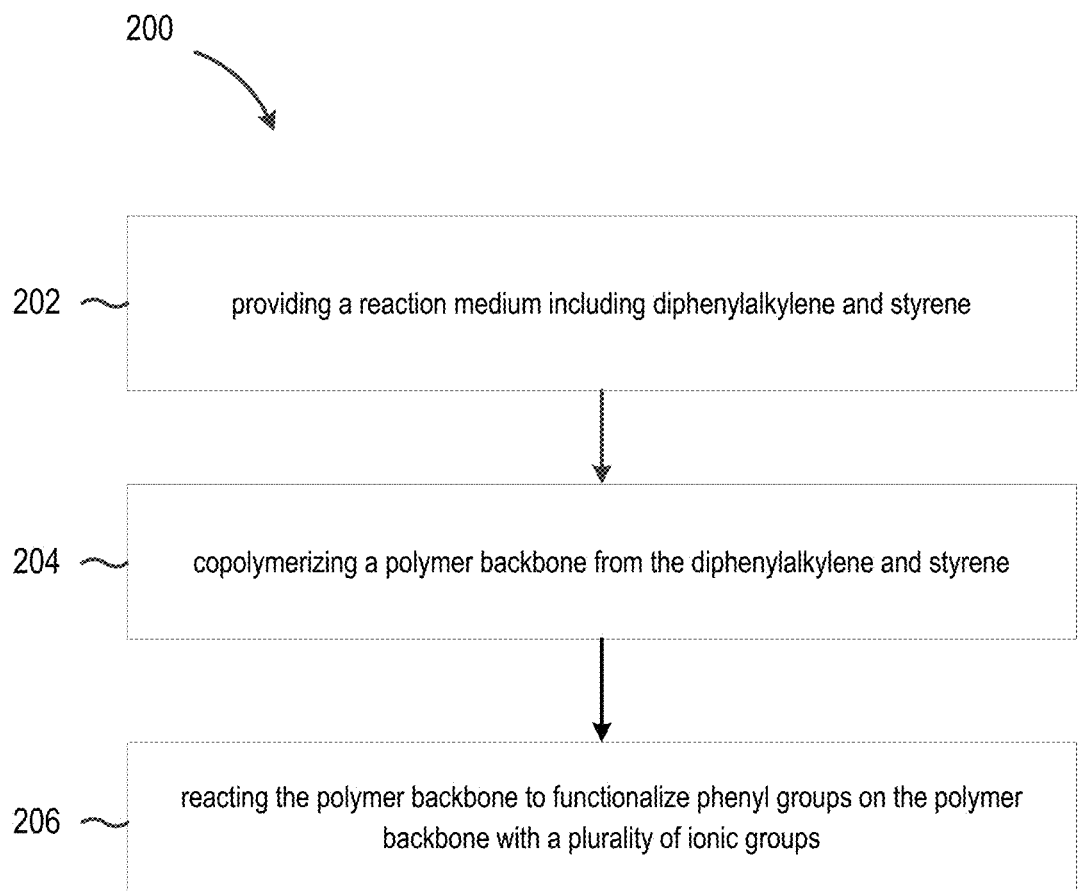
FIG. 2 is a chart of a method of making an ion exchange membrane material according to some embodiments of the present disclosure.

Referring now to FIG. 1, as discussed above, polymers consistent with the embodiments of the present disclosure can generally be formed by copolymerizing diphenylalkylenes and styrenes, then functionalizing the phenyl groups, e.g., quaternization. In the exemplary embodiment shown in FIG. 1, each $R_1$ is one or more of H, a tert-butyl group, or combinations thereof. Referring now to FIG. 2, some embodiments of the present disclosure are directed to a method 200 of making an ion exchange membrane material. In some embodiments, at 202, a reaction medium is provided. In some embodiments, the reaction medium includes diphenylalkylene and styrene. In some embodiments, the diphenylalkylene includes diphenylalkylene monomers, diphenylalkylene oligomers, diphenylalkylene polymers, or combinations thereof. In some embodiments, the diphenylalkylene is unsubstituted. In some embodiments, the diphenylalkylene includes 1,1-diphenylethylene. In some embodiments, the styrene includes styrene monomers, styrene oligomers, styrene polymers, or combinations thereof. In some embodiments, the styrene includes substituted styrene, unsubstituted styrene, or combinations thereof. In some embodiments, the styrene includes one or more functional groups. In some embodiments, the phenyl group of the styrene reaction component includes one or more functional groups. In some embodiments, the styrene is 4-tert-butylstyrene. At 204, a polymer backbone is copolymerized from the diphenylalkylene and styrene. In some embodiments, styrene is more abundant in the polymer backbone than diphenylalkylene.

In some embodiments, at 206, the polymer backbone is functionalized with a plurality of ionic functional groups at phenyl groups on the polymer backbone. In some embodiments, the phenyl groups on the polymer backbone are functionalized with ionic functional groups via chloromethylation, radical bromination, Friedel-Crafts acylation and alkylation, sulfonation followed by amination, or combinations thereof. In some embodiments, the ionic functional groups are present in alkylated substrates. In some embodiments, the polymer backbone is reacted with one or more alkylated substrates. In some embodiments, the polymer backbone is reacted with one or more alkylated substrates such that the degree of functionalization of the phenyl groups in the polymer backbone is between about 10% to about 100%. In some embodiments, the polymer backbone is reacted with one or more alkylated substrates such that the degree of functionalization of the phenyl groups in the polymer backbone is between about 10% to about 60%. In some embodiments, the polymer backbone is functionalized with one or more haloalkylated precursor substrates. In some embodiments, the one or more haloalkylated precursor substrates include a tertiary alcohol and a halogenated hydrocarbon. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, the halide of the attached haloalkylated precursor substrate is substituted with another ionic group, e.g., a quaternary ammonium group. In some embodiments, the polymers are directly employed, post-modified, or combinations thereof, e.g., for use in fabricating alkaline anion exchange membranes.

Figure 3:
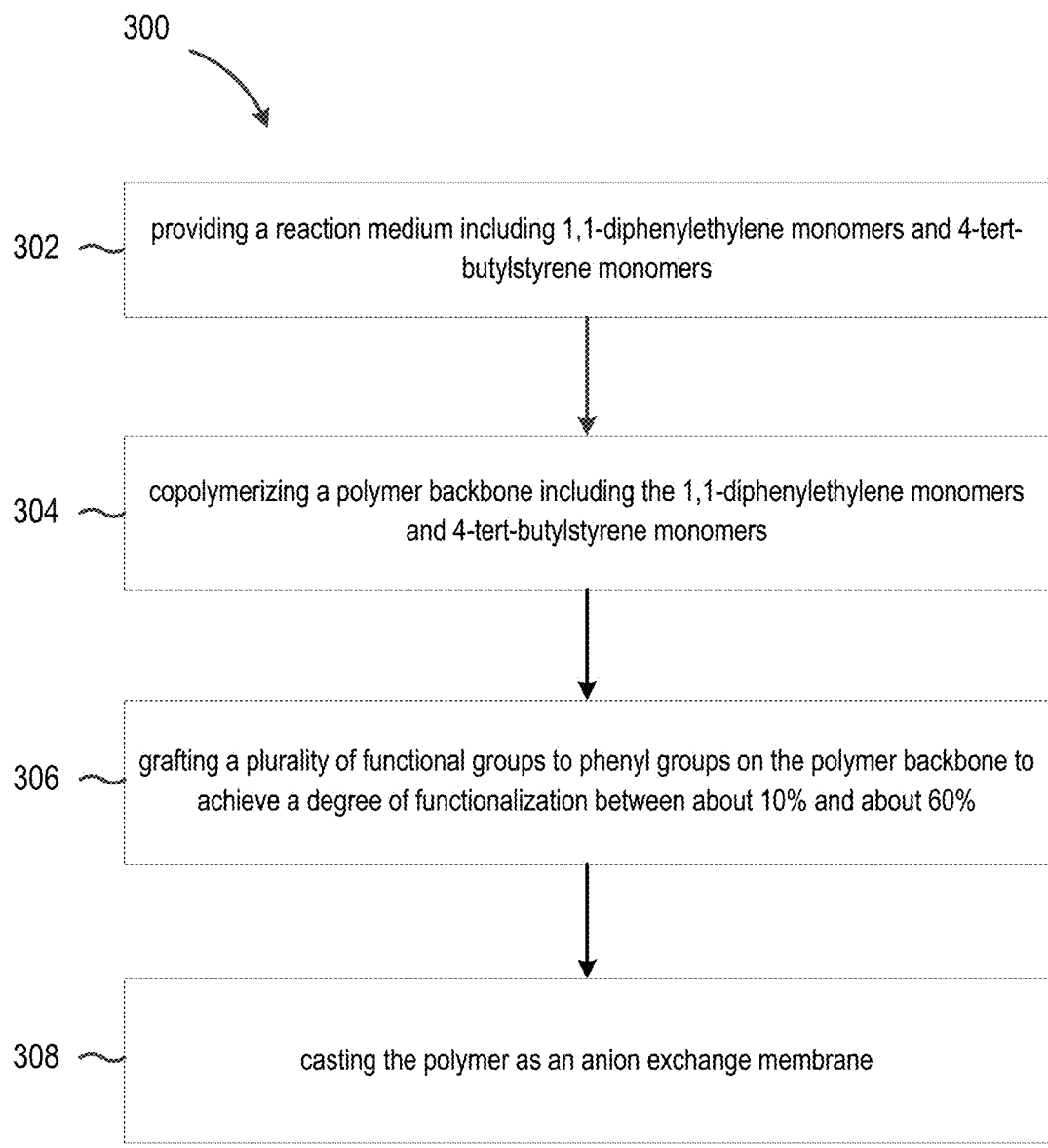
FIG. 3 is a chart of a method of making an anion exchange membrane according to some embodiments of the present disclosure.

Referring now to FIG. 3, some embodiments of the present disclosure are directed to a method 300 of making an anion exchange membrane. At 302, a reaction medium including 1,1-diphenylethylene monomers and 4-tert-butylstyrene monomers is provided. At 304, a polymer backbone including the 1,1-diphenylethylene monomers and 4-tert-butylstyrene monomers is copolymerized. At 306, a plurality of functional groups are grafted to phenyl groups on the polymer backbone to achieve a degree of functionalization between about 10% and about 60%. In some embodiments, the polymer backbone is functionalized with one or more haloalkylated precursor substrates. In some embodiments, the halide of the attached haloalkylated precursor substrate is substituted with another ionic group, e.g., a quaternary ammonium group. In some embodiments, as discussed above, the polymer includes the structure according to Formula II:

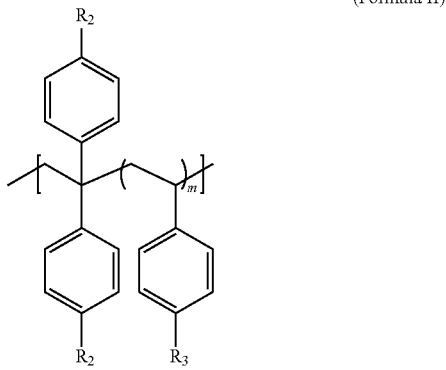

(Formula II)

In some embodiments, $R_2$ is H, an alkylated substrate, or combinations thereof. In some embodiments, $R_3$ a tert-butyl group; and m is 1 or more. In some embodiments, the alkylated substrate includes one or more quaternary ammonium groups, one or more multication hydrocarbyl groups, one or more halide groups, or combinations thereof. In some embodiments, the alkylated substrate includes Formula III:

(Formula III)

In some embodiments, each $R_4$ includes H or $CH_3$. In some embodiments, n=1 to about 7. In some embodiments, X includes a hydroxide, a halide, or combinations thereof. In some embodiments, the one or more haloalkylated precursor substrates include a tertiary alcohol and a halogenated hydrocarbon. In some embodiments, the one or more haloalkylated precursor substrates include 7-bromo-2-methyl-2-heptan-ol, 6-bromo-2-methylhexan-2-ol, 5-bromo-2-methylpentan-2-ol, or combinations thereof. In some embodiments, the halide of the attached haloalkylated precursor substrate is substituted with another ionic group, e.g., a quaternary ammonium group to arrive at Formula III. At 308, the polymer is cast as an anion exchange membrane.

Figure 4A:
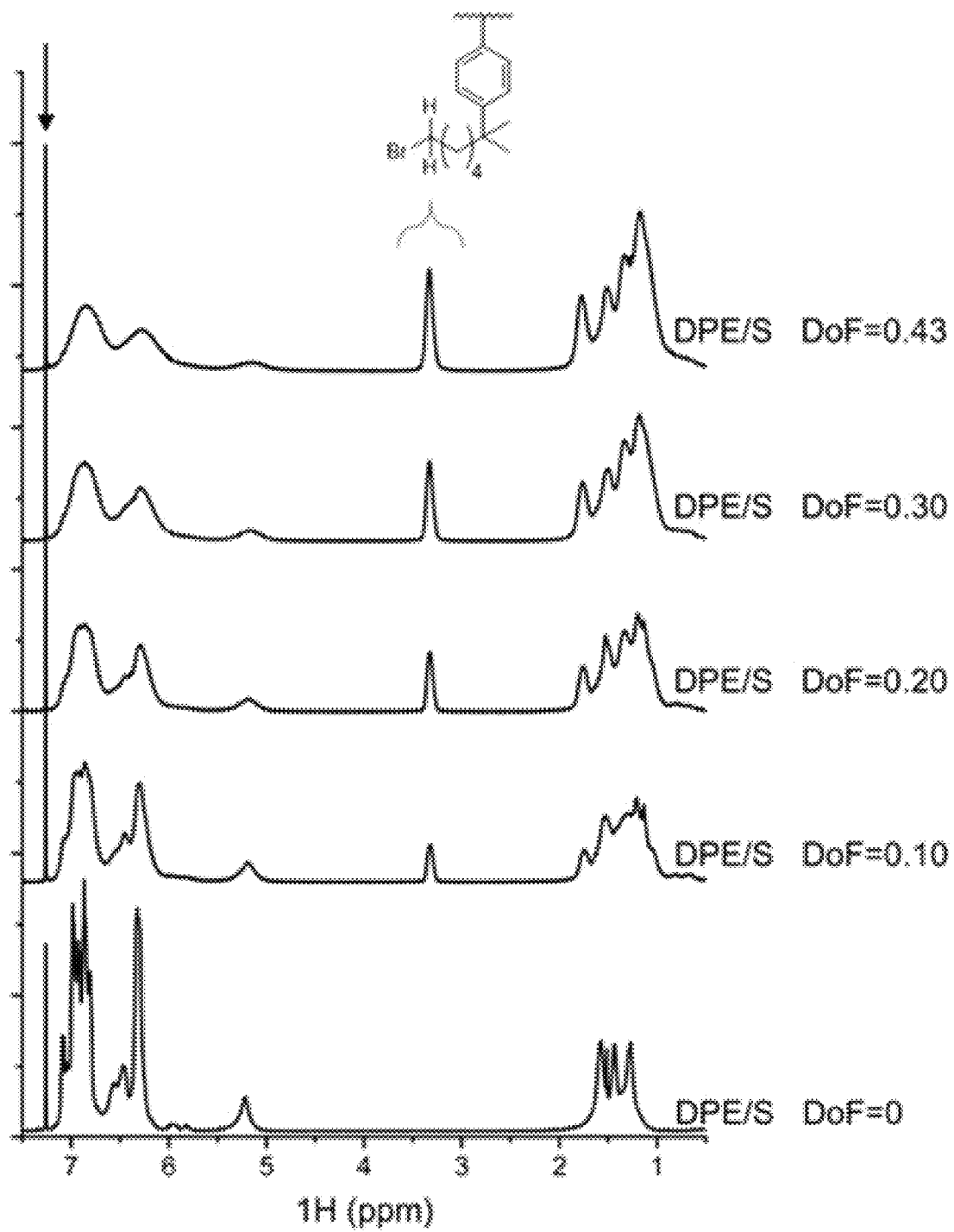
FIG. 4A are $^1H$ NMR spectrums of bromo-functionalized poly(diphenylethylene-alt-styrene) (DPE/S) intermediate copolymers according to some embodiments of the present disclosure.
Figure 4B:
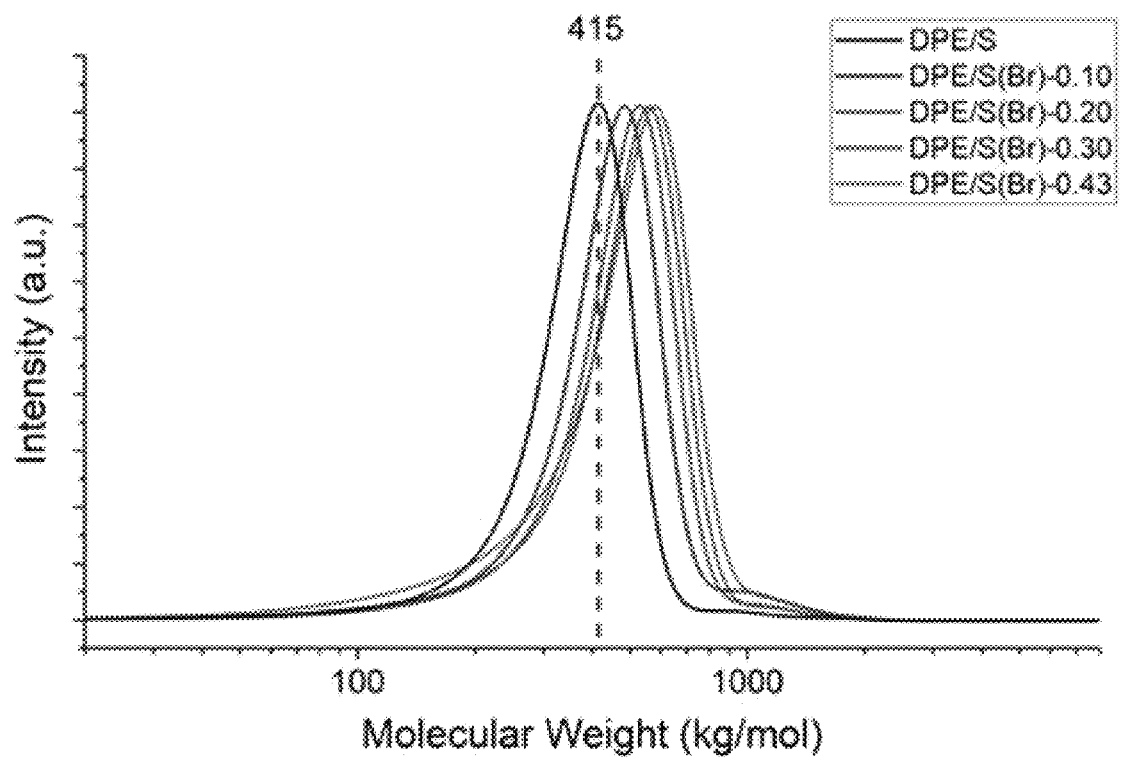
FIG. 4B is a graph showing size exclusion chromatograms of the bromo-functionalized DPE/S intermediate copolymers according to some embodiments of the present disclosure.

By way of example, 1,1-diphenylethylene/styrene (DPE/S) and 1,1-diphenylethylene/4-tert-butyl styrene (DPE/tbS) intermediate copolymers were prepared. The copolymers were functionalized with haloalkyl groups including a bromine ionic group coupled to the backbone of the copolymers via a 5 carbon tether. Referring now to FIG. 4A, the degree of functionalization for the DPE/S intermediate polymers as determined by $^1$H NMR in CDCl$_3$ (indicated by the arrow at 7.26 ppm) was between 0.1 and 0.43. Properties of the functionalized DPE/S intermediate polymers are summarized in the following Table 1. Size exclusion chromatograms of the functionalized DPE/S intermediate polymers are show in FIG. 4B.

TABLE 1

Properties of bromo-functionalized DPE/S copolymer with n = 5.

| | DoF$^a$ | Projected IEC (OH$^-$)$^b$ | Mn (kg/mol)$^c$ | Mw (kg/mol)$^c$ | Đ$^c$ | T$_g$ (°C.)$^d$ |
|---|---|---|---|---|---|---|
| DPE/S | n/a | n/a | 330 | 390 | 1.2 | 173 |
| DPE/S(Br)-0.10 | 0.10 | 0.9 | 390 | 480 | 1.2 | 158 |
| DPE/S(Br)-0.20 | 0.20 | 1.5 | 400 | 500 | 1.2 | 142 |
| DPE/S(Br)-0.30 | 0.30 | 1.9 | 400 | 510 | 1.3 | 128 |
| DPE/S(Br)-0.43 | 0.43 | 2.4 | 360 | 510 | 1.4 | 114 | aDegree of Functionalization, fraction of phenyls functionalized, determined from $^1$H NMR.
bDetermined from $^1$H NMR.
c'Measured by size exclusion chromatography.
dMeasured by differential scanning calorimetry.

Figure 5A:
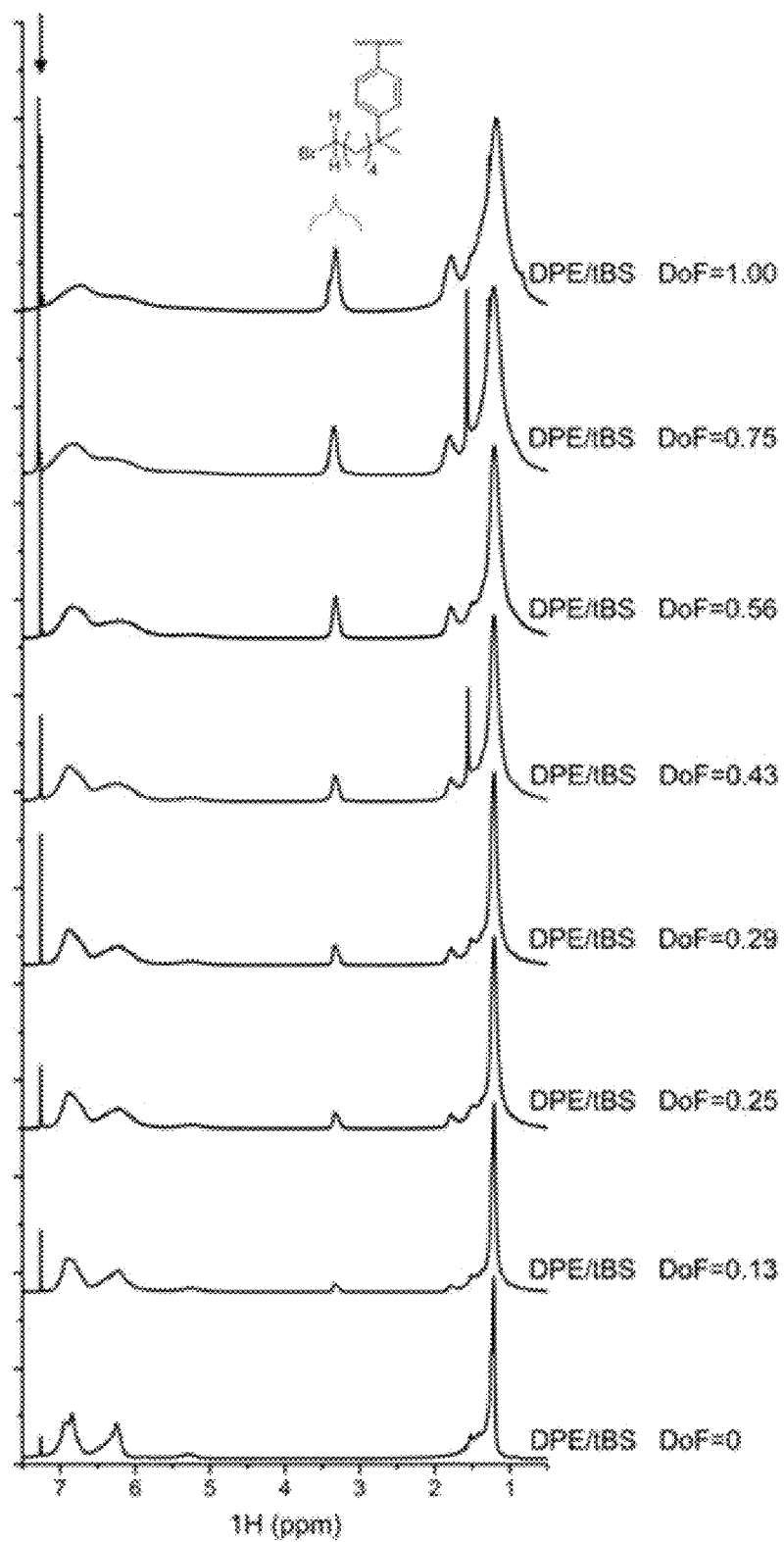
FIG. 5A are $^1H$ NMR spectrums of bromo-functionalized poly(diphenylethylene-alt-tertiary-butylstyrene) (DPE-tbS) intermediate copolymers according to some embodiments of the present disclosure.
Figure 5B:
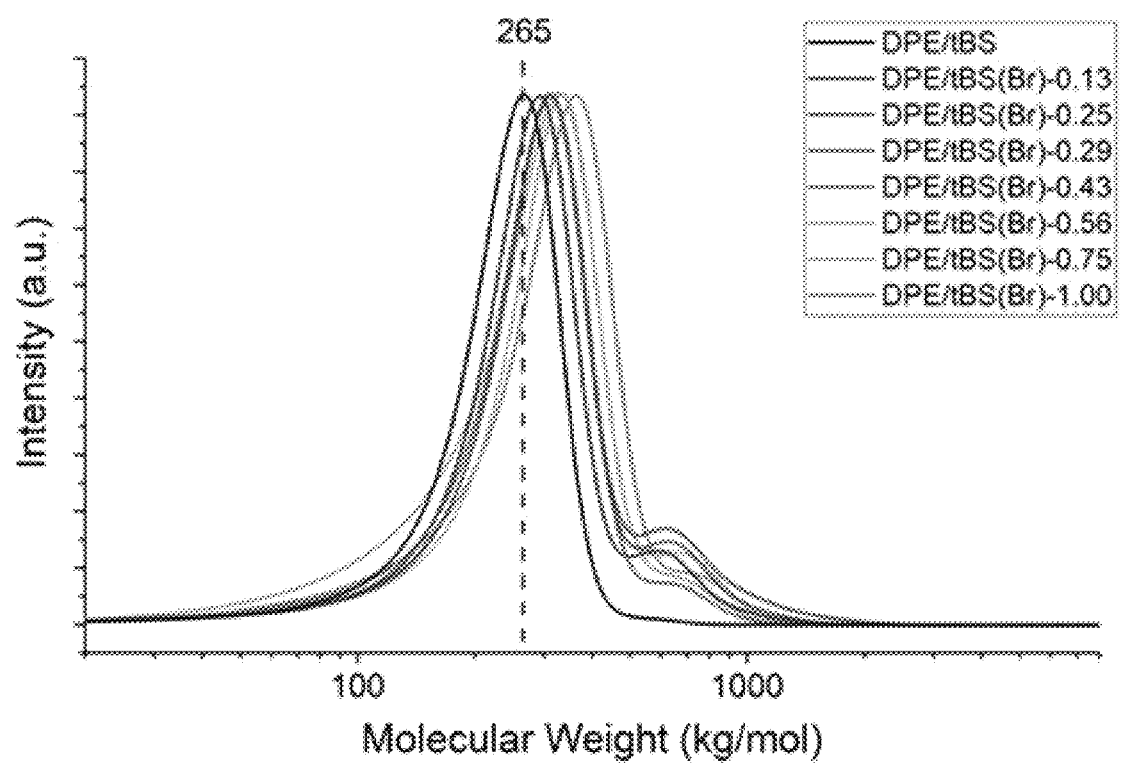
FIG. 5B is a graph showing size exclusion chromatograms of the bromo-functionalized DPE/tbS intermediate copolymers according to some embodiments of the present disclosure.

Referring now to FIG. 5A, the degree of functionalization for the DPE/tBS polymers as determined by $^1$H NMR in CDCl$_3$ was between 0.1 and 1.00. Properties of the functionalized DPE/tBS intermediate polymers are summarized in the following Table 2. Size exclusion chromatograms of the functionalized DPE/tBS intermediate polymers are show in FIG. 5B.

TABLE 2

Properties of bromo-functionalized DPE/tBS copolymer with n = 5.

| | DoF$^a$ | Projected IEC(OH$^-$)$^b$ | M$_n$ (kg/mol)$^c$ | M$_w$ (kg/mol)$^c$ | Đ$^c$ | T$_g$ (°C.)$^d$ |
|---|---|---|---|---|---|---|
| DPE/tBS | n/a | n/a | 200 | 250 | 1.2 | 195 |
| DPE/tBS(Br)-0.13 | 0.13 | 0.7 | 230 | 310 | 1.3 | 175 |
| DPE/tBS(Br)-0.25 | 0.25 | 1.1 | 250 | 350 | 1.4 | 161 |
| DPE/tBS(Br)-0.29 | 0.29 | 1.3 | 250 | 330 | 1.3 | 159 |
| DPE/tBS(Br)-0.43 | 0.43 | 1.7 | 240 | 310 | 1.3 | 146 |
| DPE/tBS(Br)-0.56 | 0.56 | 2.0 | 260 | 350 | 1.4 | 135 |
| DPE/tBS(Br)-0.75 | 0.75 | 2.4 | 220 | 300 | 1.4 | 121 |
| DPE/tBS(Br)-1.00 | 1.00 | 2.8 | 230 | 340 | 1.5 | 113 | aDegree of Functionalization, fraction of phenyls functionalized, determined from $^1$H NMR.
bDetermined from $^1$H NMR.
c'Measured by size exclusion chromatography.
dMeasured by differential scanning calorimetry.

Figure 6A:
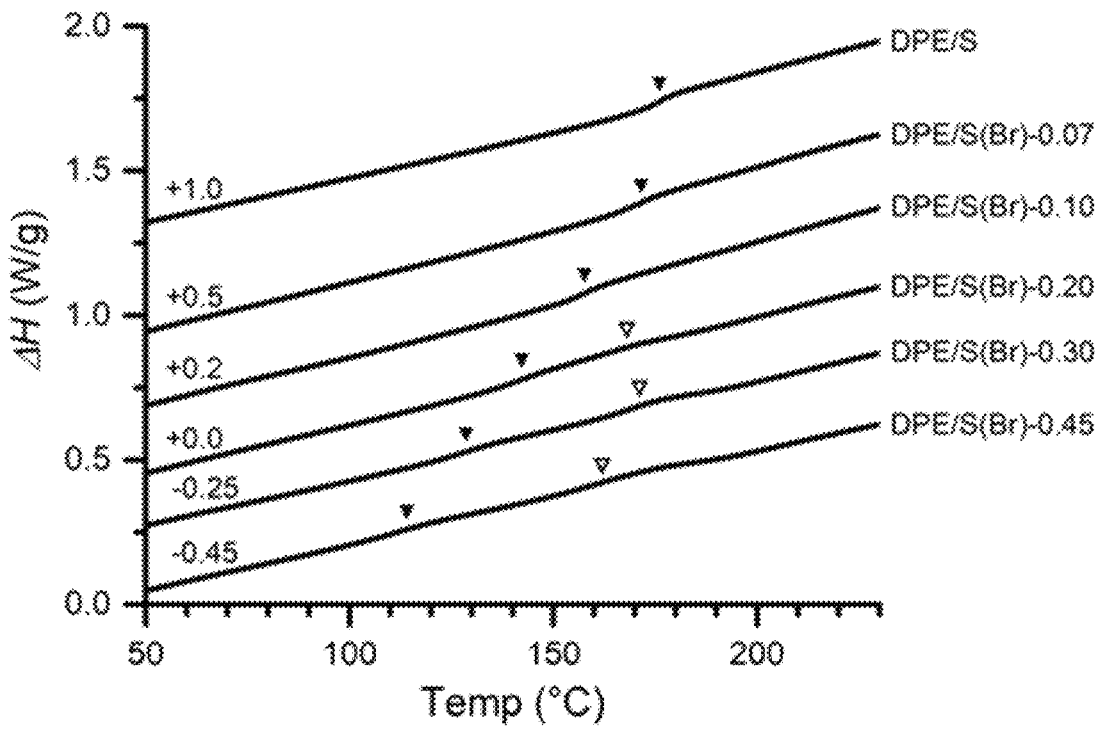
FIG. 6A is a graph portraying differential scanning calorimetry of bromo-functionalized DPE/S intermediate copolymers according to some embodiments of the present disclosure, wherein the filled triangles indicate $T_g$, the unfilled triangles indicate a second $T_g$, and thermograms are vertically shifted by the shift factors on the left.
Figure 6B:
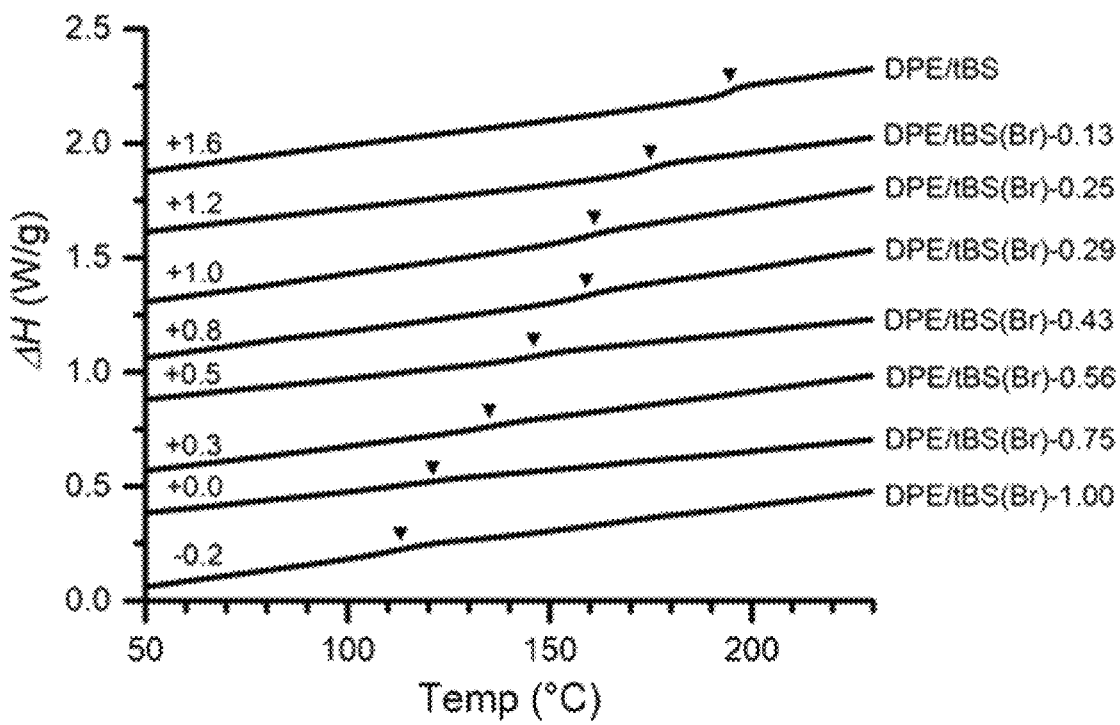
FIG. 6B is a graph portraying differential scanning calorimetry of bromo-functionalized DPE/tbS intermediate copolymers according to some embodiments of the present disclosure, wherein the filled triangles indicate $T_g$ and thermograms are vertically shifted by the shift factors on the left.

Referring now to FIGS. 6A and 6B, results of differential scanning calorimetry analysis of the DPE/S and DPE/tbS intermediates are shown. As can be seen, glass transition temperatures remained above 100° C. even at high degrees of functionalization. The polymers thus remain suitable for use at high-temperature operating conditions in anion exchange membranes, e.g., in electrochemical energy conversion systems.

Figure 7:
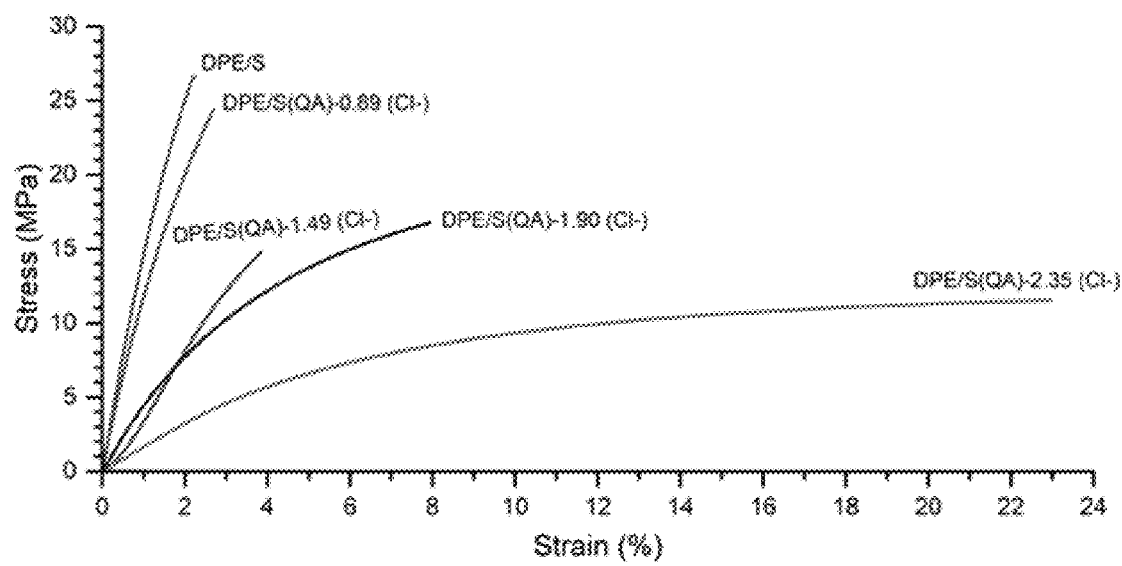
FIG. 7 shows stress versus strain curves of quaternary ammonium-functionalized DPE/S (DPE/S(QA)) with chloride counter ion membranes according to some embodiments of the present disclosure at 50° C. and 50% relative humidity, wherein the ion exchange capacities of membranes are noted in the sample names.

The bromine of the ionic functional groups were then substituted with quaternary ammonium groups to convert the intermediate copolymers (DPE/S(Br) and DPE/tbS(Br)) to DPE/S(QA) and DPE/tbS(QA), respectively. Conductivity analysis of these polymers can be seen in Tables 3 and 4 below. By maintaining stability at elevated temperatures, membranes composed of the polymers of the present disclosure can benefit from the increased conductivities achieved with increasing temperature. Finally, as can be seen in FIG. 7, the material also achieve higher degrees of ductility as ion exchange capacities increase.

TABLE 3

Conductivity of DPE/S(QA) copolymers.

| | Cl⁻/OH⁻ σ (mS/cm) | | | |
|---|---|---|---|---|
| | 30° C. | 60° C. | 80° C. | 95° C. |
| DPE/S(QA)-0.10 | —/6 | —/12 | —/21 | /27 |
| DPE/S(QA)-0.20 | 6/42 | 15/73 | 29/99 | 49/109 |
| DPE/S(QA)-0.30 | 13/46 | 34/88 | 51/95 | 70/76 |
| DPE/S(QA)-0.43 | 27/— | 38/— | 30/— | 21/— |

TABLE 4

Conductivity of DPE/S(QA) copolymers.

| | Cl⁻/OH⁻ σ (mS/cm) | | | |
|---|---|---|---|---|
| | 30° C. | 60° C. | 80° C. | 95° C. |
| DPE/tBS(QA)-0.29 | 4/10 | 8/24 | 14/40 | 19/46 |
| DPE/tBS(QA)-0.43 | 8/— | 20/— | 31/— | 44/— |
| DPE/tBS(QA)-0.56 | 16/65 | 33/97 | 55/121 | 57/91 |
| DPE/tBS(QA)-0.75 | 20/56 | 41/73 | 60/54 | 78/40 |
| DPE/tBS(QA)-1.00 | 28/— | 46/— | 28/— | 21/— |

Figure 8:
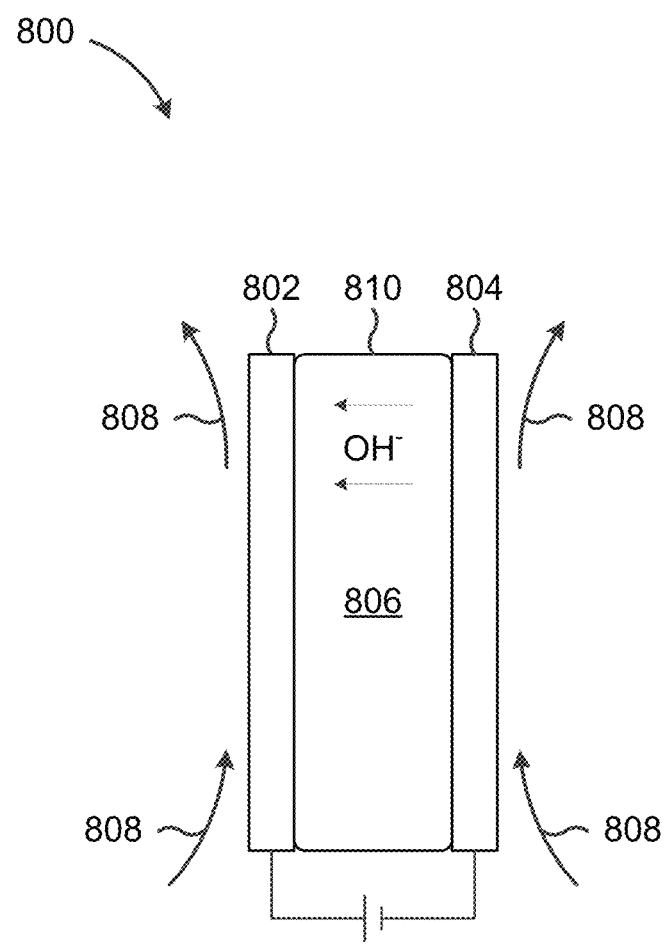
FIG. 8 is a schematic drawing of an electrochemical energy conversion system including an ion exchange membrane according to some embodiments of the present disclosure.

Referring now to FIG. 8, in some embodiments, the ion exchange membrane material is incorporated into an electrochemical energy conversion system 800. In some embodiments, system 800 includes an anode 802, a cathode 804, and an electrolyte 806 disposed between the anode and the cathode. System 800 is suitable for use in numerous applications, such as fuel cells, energy recovery ventilation systems, water electrolysis systems, electrochemical hydrogen compressors, batteries, sensors, actuators, etc. In some embodiments, anode 802 and cathode 804 are composed of any suitable material for use with electrolyte 806 in system 800. In some embodiments, system 800 includes any inlets/outlets 808 to supply reactants to and remove reaction products from anode 802, cathode 804, and electrolyte 806. In some embodiments, system 800 includes a catalyst layer (not pictured).

In some embodiments, electrolyte 806 includes a solid electrolyte. In some embodiments, electrolyte 806 includes ion exchange membrane 810 including the ion exchange membrane material consistent with the embodiments discussed above. In some embodiments, ion exchange membrane 810 is an anion exchange membrane.

Methods and systems of the present disclosure maintain high glass transition temperatures from copolymers synthesized using diphenylalkylene and styrene-derivative monomers. The phenyl groups from the diphenylalkylene and styrene derivatives are then functionalized with ionic functional groups, making the polymers particularly suitable for use as anion exchange membranes. Incorporating 1,1-diphenylethylene in the backbone of these copolymers has the effect of increasing the glass transition temperature, increasing the thermal stability of alkaline anion exchange membrane made from these polymers. The properties of the membranes are tunable according to the needs of the end user by selecting the combination of functional groups used and the degree of functionalization of the phenyl groups, while maintaining operational stability at elevated temperatures. High-temperature conditions enabled by these copolymers enhance conductivity performance, particularly advantageous for use in fuel cells, electrolyzers employing hydrogen, ion separations, etc.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. An ion exchange membrane material comprising:
a polymer according to Formula I:

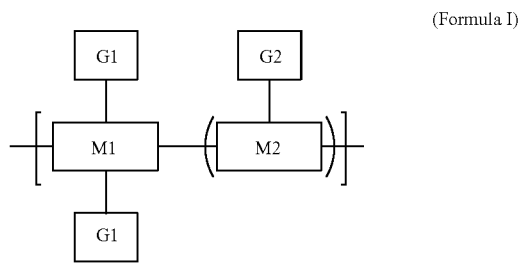

(Formula I)

wherein M1 is a diphenylalkylene; M2 is a styrene; G1 includes one or more ionic functional groups, hydrocarbyl groups, H, or combinations thereof; and G2 includes one or more ionic functional groups, hydrocarbyl groups, H, or combinations thereof.

2. The ion exchange membrane material according to claim 1, wherein the polymer includes the structure according to Formula II:

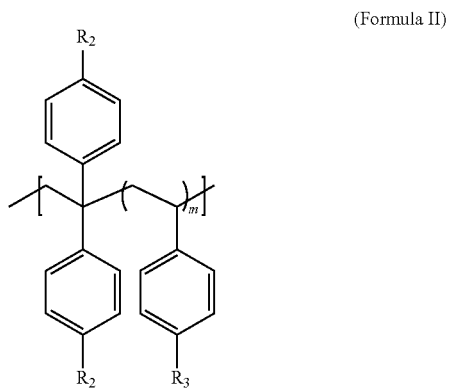

(Formula II)

wherein $R_2$ is H, an alkylated substrate, or combinations thereof; $R_3$ is H, a tert-butyl group, an alkylated substrate, or combinations thereof; and m is 1 or more,
wherein the alkylated substrate includes a hydrocarbyl group and at least one ionic group.

3. The ion exchange membrane material according to claim 2, wherein the alkylated substrate includes one or more quaternary ammonium groups, one or more multication hydrocarbyl groups, one or more halide groups, or combinations thereof.

4. The ion exchange membrane material according to claim 3, wherein the alkylated substrate includes Formula III:

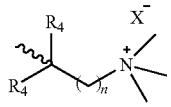
(Formula III)
wherein each $R_4$ includes H or a hydrocarbyl group; n=1 to about 20; and X includes one or more hydroxides, halides, or combinations thereof.
5. The ion exchange membrane material according to claim 2, wherein the percentage of $R_2$ and $R_3$ that are an alkylated substrate is between about 10% and about 100%.
* * * * *